(12) United States Patent
Zhang et al.

(10) Patent No.: US 12,717,151 B2
(45) Date of Patent: Aug. 25, 2026

(54) VIRTUAL REALITY APPARATUS

(71) Applicant: Zhejiang Sunny Optics Co., Ltd, Yuyao City (CN)

(72) Inventors: Xiaobin Zhang, Yuyao City (CN); Litong Song, Yuyao City (CN); Yinfang Jin, Yuyao City (CN); Liefeng Zhao, Yuyao City (CN)

(73) Assignee: Zhejiang Sunny Optics Co., Ltd, Yuyao City (CN)

( * ) Notice: Subject to any disclaimer, the term of this patent is extended or adjusted under 35 U.S.C. 154(b) by 66 days.

(21) Appl. No.: 18/982,572

(22) Filed: Dec. 16, 2024

(65) Prior Publication Data

US 2025/0314899 A1 Oct. 9, 2025

(30) Foreign Application Priority Data

Apr. 9, 2024 (CN) ......................... 202410425437.3

(51) Int. Cl.

| | |
|---|---|
| ***G02B 9/16*** | (2006.01) |
| ***G02B 9/64*** | (2006.01) |
| ***G02B 13/00*** | (2006.01) |
| ***G02B 13/18*** | (2006.01) |
| ***G02B 25/00*** | (2006.01) |

(Continued)

(52) U.S. Cl.

CPC ........... *G02B 27/0955* (2013.01); *G02B 9/16* (2013.01); *G02B 9/64* (2013.01); *G02B 13/0015* (2013.01); *G02B 13/0045* (2013.01); *G02B 13/18* (2013.01); *G02B 25/001* (2013.01); *G02B 27/0101* (2013.01); *G02B 27/0172* (2013.01); *G02B 27/286* (2013.01); *G02B 2027/0138* (2013.01)

(58) Field of Classification Search

None

See application file for complete search history.

(56) References Cited

U.S. PATENT DOCUMENTS

| | | | | |
|---|---|---|---|---|
| 11,803,062 | B1 * | 10/2023 | Huang | G02B 9/12 |
| 2024/0345380 | A1 * | 10/2024 | Chen | G02B 25/001 |

(Continued)

FOREIGN PATENT DOCUMENTS

| | | | | |
|---|---|---|---|---|
| CN | 116893520 | A * | 10/2023 | G02B 27/0101 |
| CN | 117008333 | A * | 11/2023 | G02B 27/0101 |

(Continued)

*Primary Examiner* — Derek S. Chapel

(74) *Attorney, Agent, or Firm* — Reising Ethington P.C.

(57) ABSTRACT

The present disclosure discloses a virtual reality apparatus, including a first optical system and a second optical system; the first optical system sequentially includes, along a first optical axis from a first side to a second side, a first lens having a positive refractive power, a reflective polarizing element, a quarter wave plate, a second lens and a third lens having a positive refractive power; the second optical system sequentially includes, along a second optical axis from an object side to an image side: a first lens element having a negative refractive power; a second lens element having a negative refractive power; a third lens element having a positive refractive power; a fourth lens element having a positive refractive power; a fifth lens element; a sixth lens element having a negative refractive power; a seventh lens element having a positive refractive power; and an eighth lens element.

15 Claims, 11 Drawing Sheets

(51) Int. Cl.

| | |
|---|---|
| ***G02B 27/01*** | (2006.01) |
| ***G02B 27/09*** | (2006.01) |
| ***G02B 27/28*** | (2006.01) |

(56) References Cited

U.S. PATENT DOCUMENTS

2024/0369837 A1* 11/2024 Chen ........................ G02B 9/12
2025/0314814 A1* 10/2025 Liu ...................... G02B 5/3025
2025/0314856 A1* 10/2025 Zhang ...................... G02B 9/64

FOREIGN PATENT DOCUMENTS

CN 117806043 A * 4/2024 ............ G02B 17/08
CN 222213072 U * 12/2024

* cited by examiner

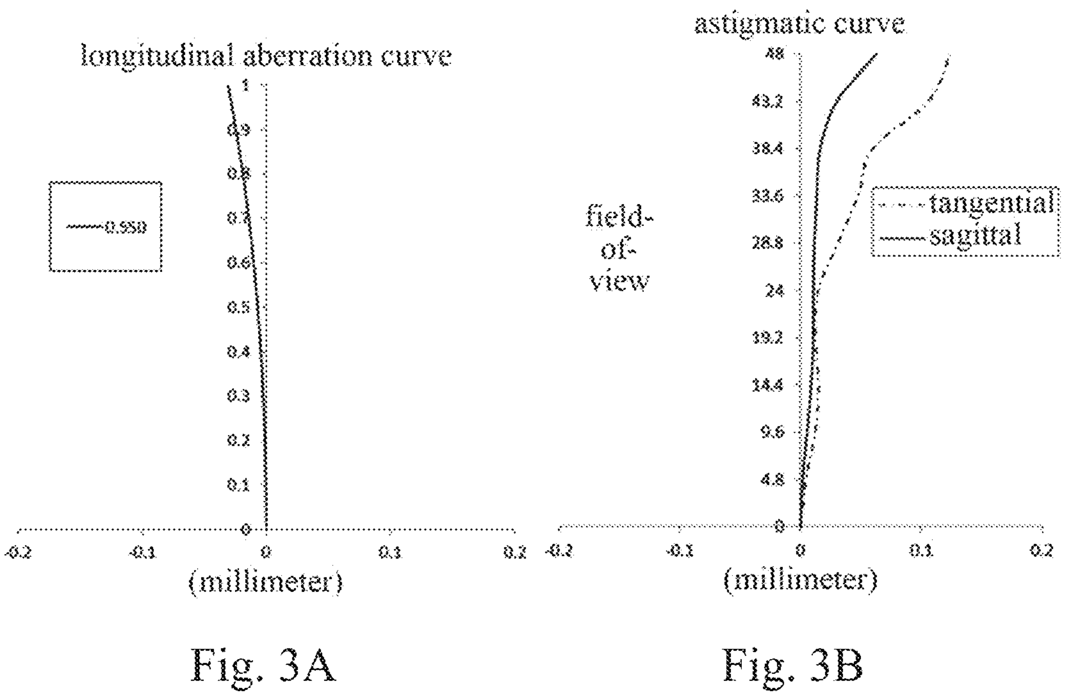
Fig. 3A
Fig. 3B
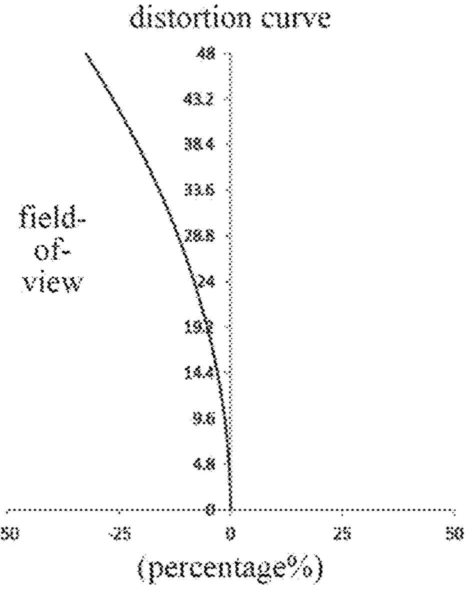
Fig. 3C

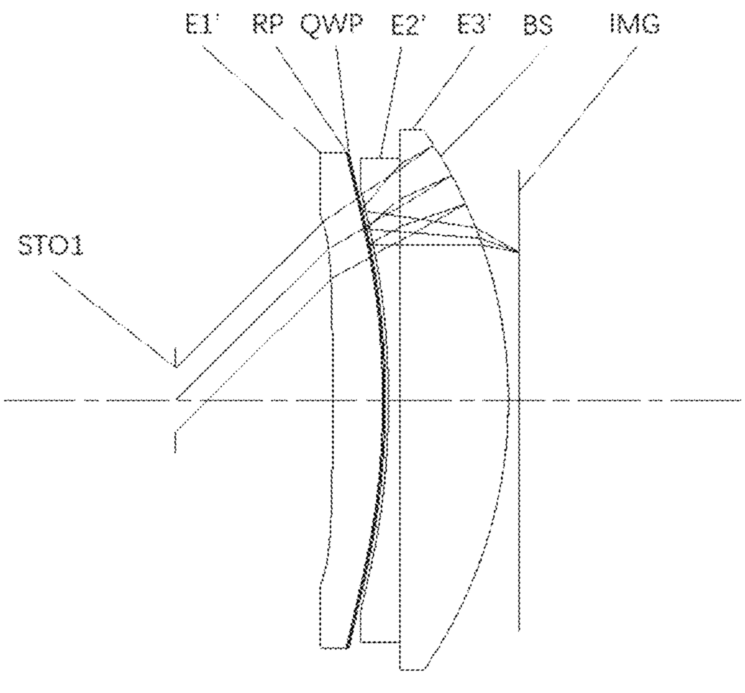
Fig. 4
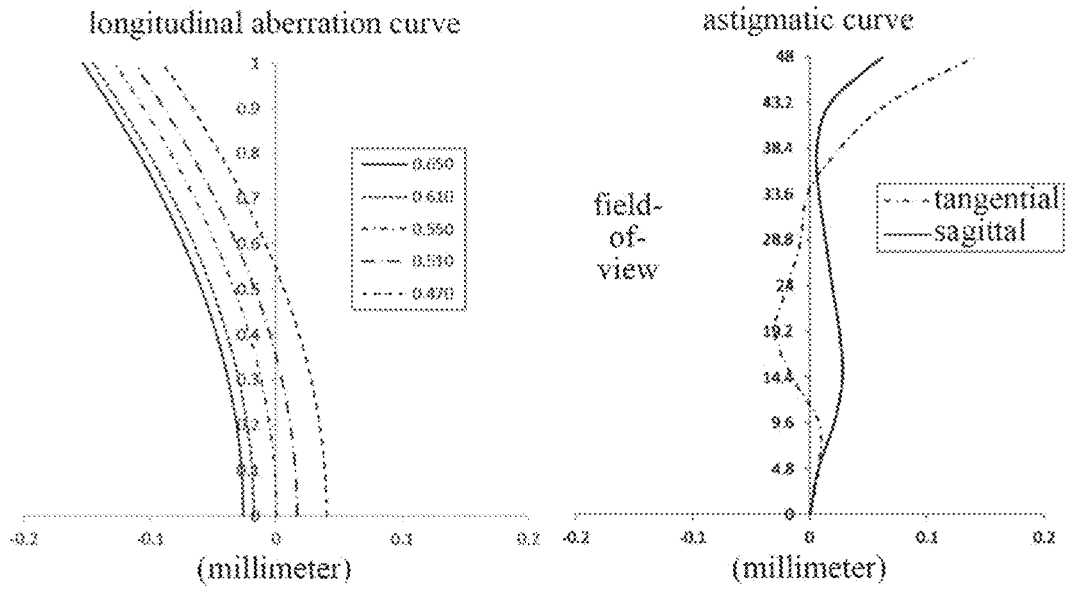
Fig. 5A
Fig. 5B

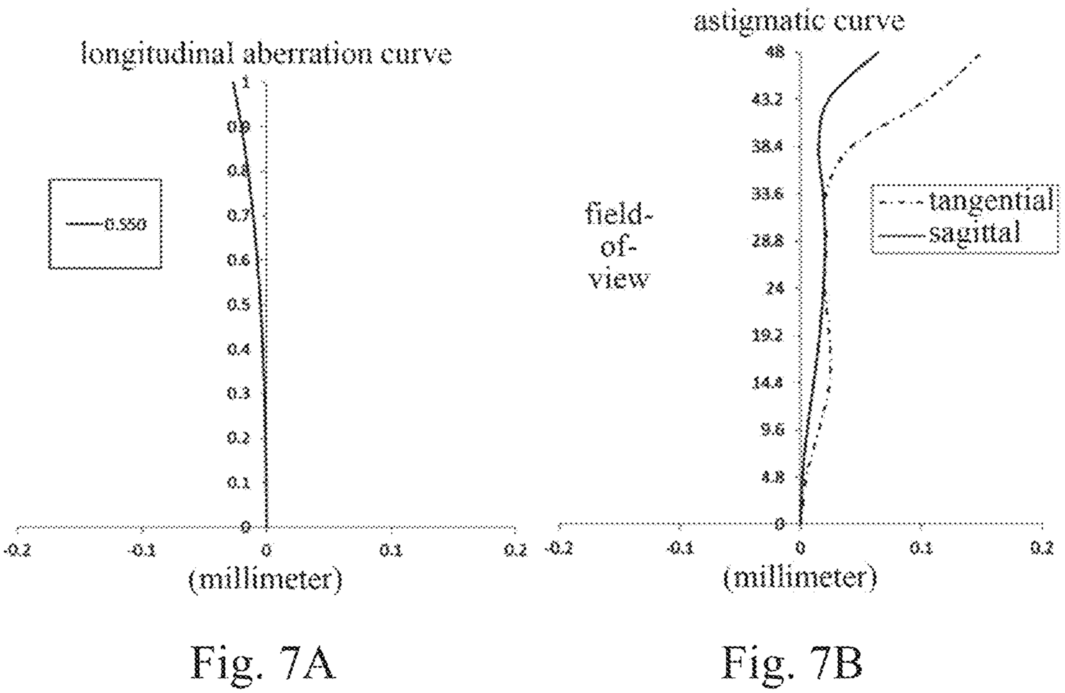
Fig. 7A
Fig. 7B
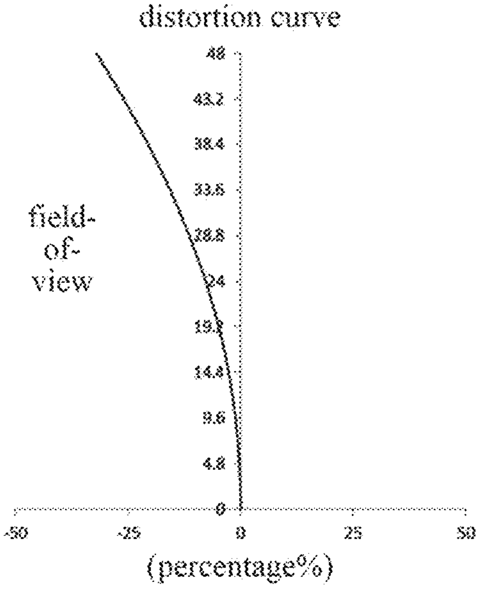
Fig. 7C

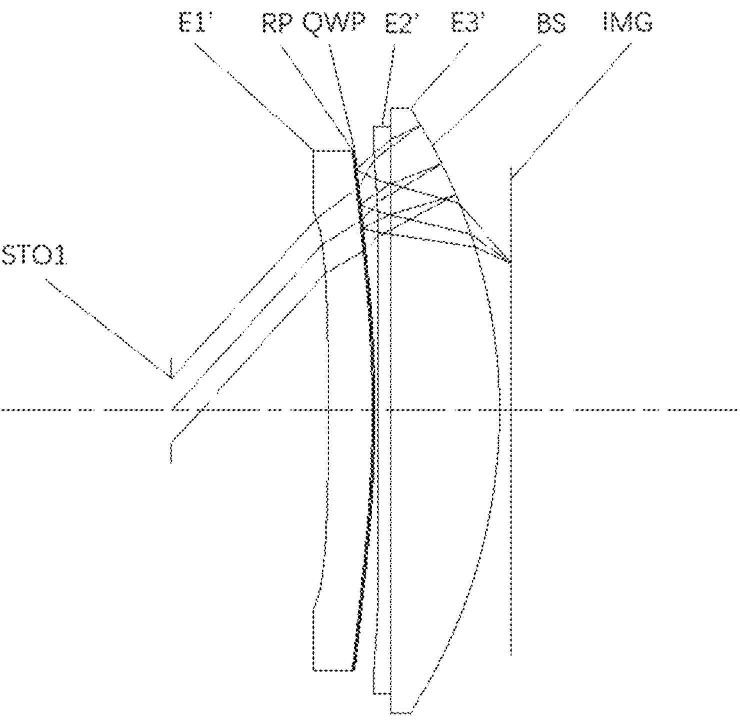
Fig. 8
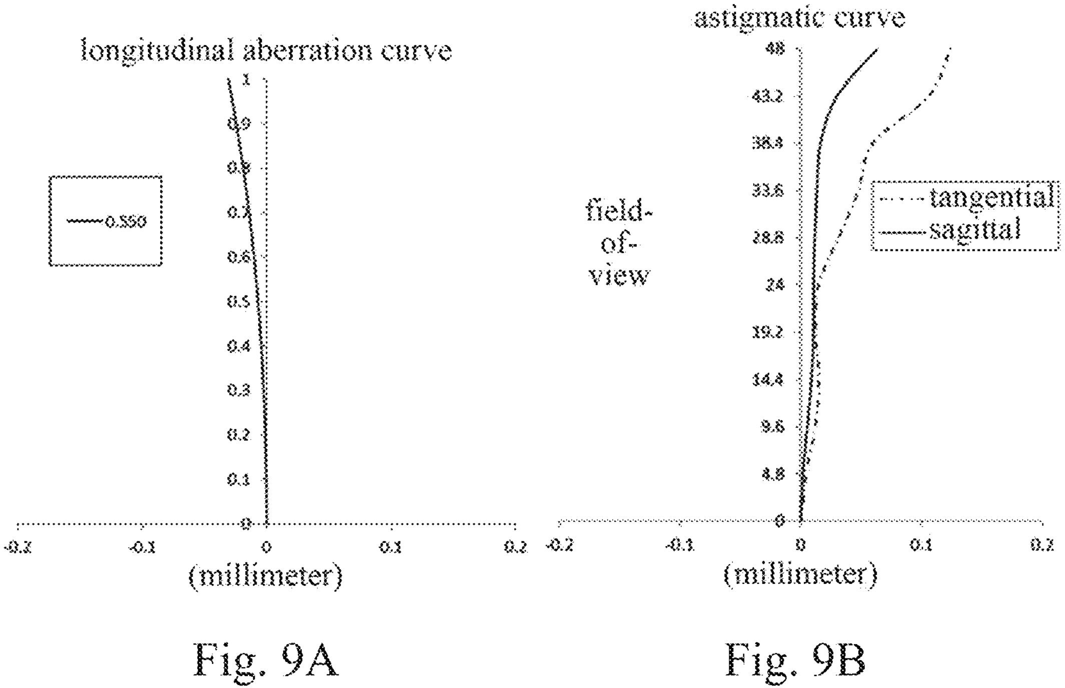
Fig. 9A
Fig. 9B

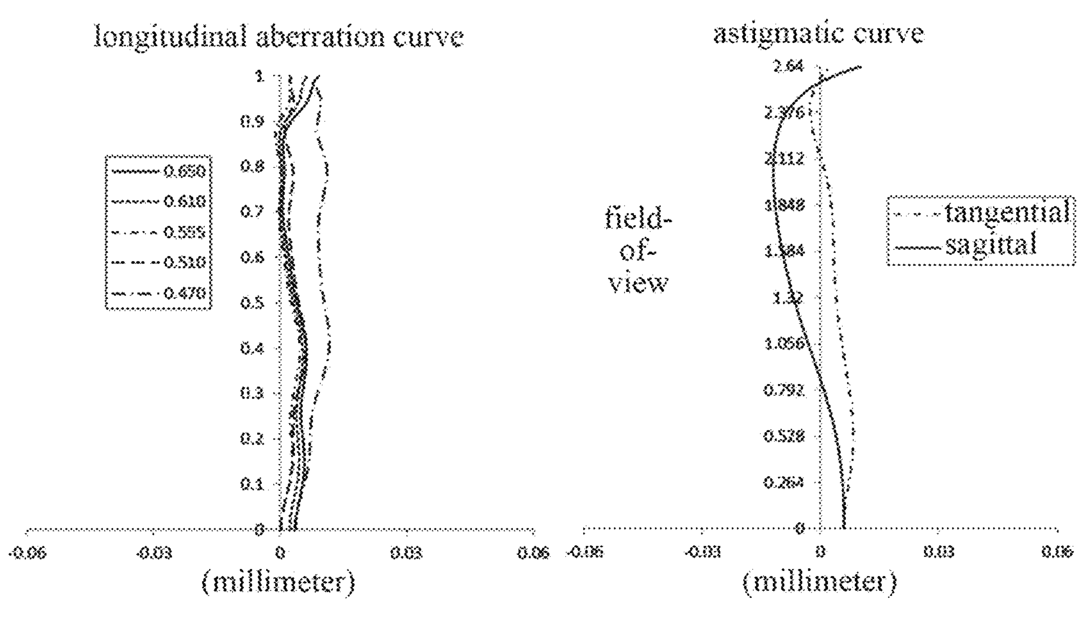
Fig. 11A
Fig. 11B
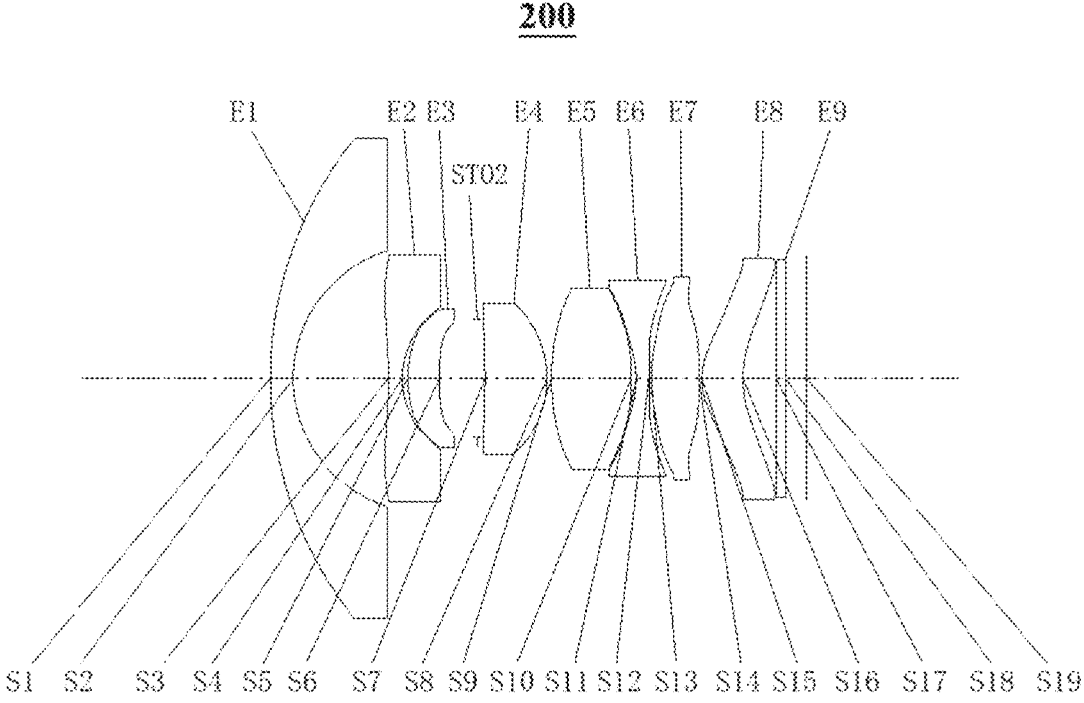
Fig. 12

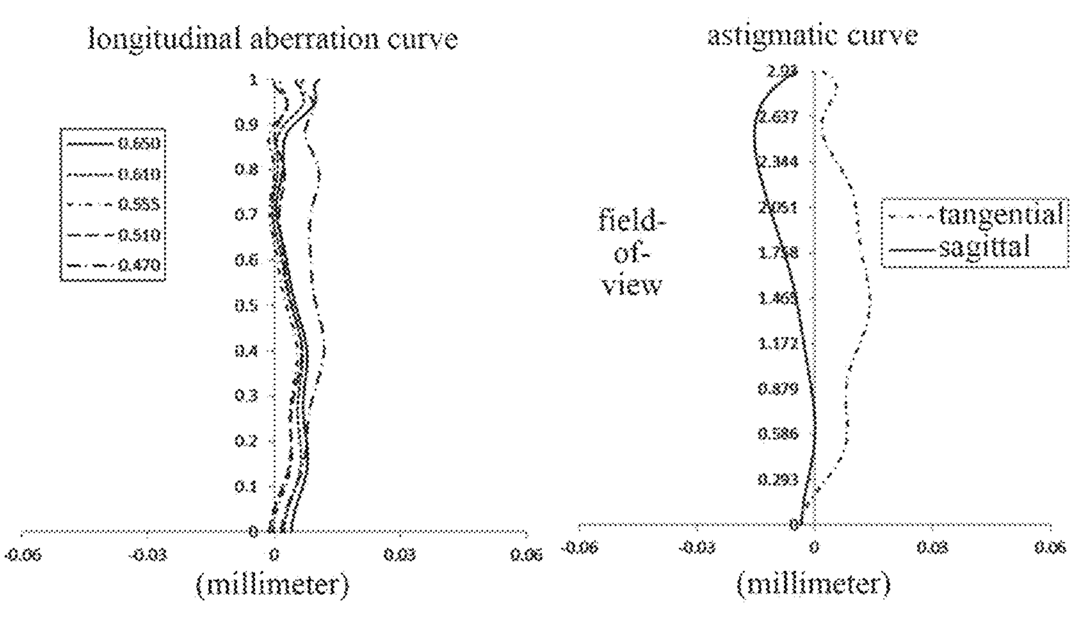
Fig. 13A
Fig. 13B
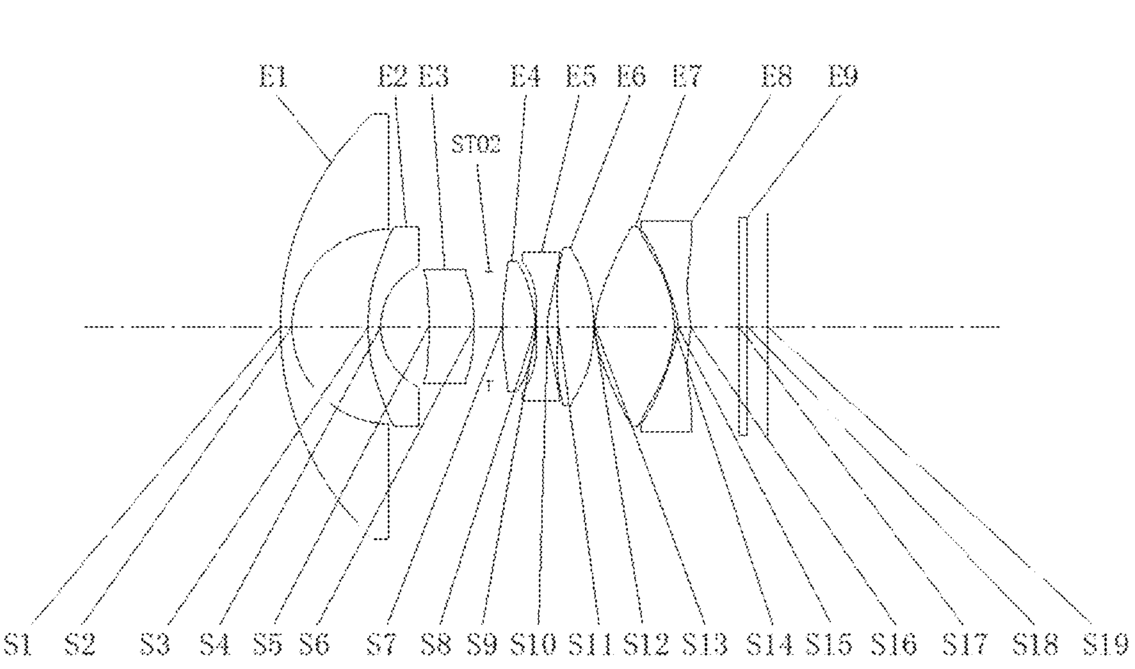
Fig. 14

VIRTUAL REALITY APPARATUS

CROSS-REFERENCE TO RELATED APPLICATIONS

This application claims the priority from Chinese Patent Application No. 202410425437.3, filed in the National Intellectual Property Administration (CNIPA) on Apr. 9, 2024, the content of which is hereby incorporated by reference in its entirety.

TECHNICAL FIELD

The present disclosure relates to the field of optical devices, in particular to a virtual reality apparatus.

BACKGROUND

With the development of virtual reality technology, virtual reality apparatuses gradually transition from single magnifying and projecting tools to linkage interaction devices. In order to meet the demand for linkage interaction, virtual reality apparatuses typically include two forms of lens assemblies, for example, visual lens assemblies and functional lens assemblies such as perspective or positioning lens assemblies. Functional lens assemblies acquire environmental information, which may be paired with visual lens assemblies to link the real world with the virtual world, and realize interaction between the real world and the virtual world.

SUMMARY

The present disclosure provides a virtual reality apparatus that may at least solve, or partially solve, at least one problem or other problems in the existing technology.

An aspect of the present disclosure provides a virtual reality apparatus, including a first optical system and a second optical system; the first optical system sequentially includes, along a first optical axis from a first side to a second side, a first lens having a positive refractive power, a reflective polarizing element, a quarter wave plate, a second lens having a refractive power and a third lens having a positive refractive power; the second optical system sequentially includes, along a second optical axis from an object side to an image side: a first lens element having a negative refractive power; a second lens element having a negative refractive power; a third lens element having a positive refractive power; a fourth lens element having a positive refractive power; a fifth lens element having a refractive power; a sixth lens element having a negative refractive power; a seventh lens element having a positive refractive power; and an eighth lens element having a refractive power; where, a real image formed by the second optical system is transmitted in a form of an electrical signal to a display screen on the second side of the first optical system, and the first optical system is used to project an imaginary image of the display screen and the real image transmitted to the display screen; a total effective focal length f' of the first optical system, a radius of curvature R1' of a first side surface of the first lens, a total effective focal length f of the second optical system, and a radius of curvature R1 of the object-side surface of the first lens element satisfy: $-0.2<(f'/R1')/(f/R1)<1.3$.

In an exemplary embodiment of the present disclosure, an effective focal length f1' of the first lens, an entrance pupil diameter EPD' of the first optical system, an effective focal length f1 of the first lens element, and an entrance pupil diameter EPD of the second optical system satisfy: $-0.4\leq(EPD'/f1')/(EPD/f1)<-0.1$.

In an exemplary embodiment of the present disclosure, a distance TD' from the first side surface of the first lens to a second side surface of the third lens on the first optical axis, a center thickness CT1' of the first lens on the first optical axis, a distance TD from the object-side surface of the first lens element to an image-side surface of the eighth lens element on the second optical axis, and a center thickness CT1 of the first lens element on the second optical axis satisfy: $0<(TD'/CT1')/(TD/CT1)<0.25$.

In an exemplary embodiment of the present disclosure, a sum of center thicknesses ΣCT' of lenses from the first lens to the third lens on the first optical axis, a sum of center thicknesses ΣCT of lenses from the first lens element to the eighth lens element on the second optical axis, the total effective focal length f' of the first optical system and the total effective focal length f of the second optical system satisfy: $0.1<(\Sigma CT'/f')/(\Sigma CT/f)<0.4$.

In an exemplary embodiment of the present disclosure, a combined focal length f23' of the second lens and the third lens and the effective focal length f1' of the first lens satisfy: $0.2<f23'/f1'<1.3$.

In an exemplary embodiment of the present disclosure, an effective focal length f2' of the second lens and an effective focal length f3' of the third lens satisfy: $0<f3'/|f2'|<0.65$.

In an exemplary embodiment of the present disclosure, a radius of curvature R2' of a second side surface of the first lens and the radius of curvature R1' of the first side surface of the first lens satisfy: $-1.8<R2'/R1'<0.3$.

In an exemplary embodiment of the present disclosure, a center thickness CT2' of the second lens on the first optical axis and a center thickness CT3' of the third lens on the first optical axis satisfy: $4.7<CT3'/CT2'<9.3$.

In an exemplary embodiment of the present disclosure, the total effective focal length f of the second optical system and a maximal field-of-view FOV of the second optical system satisfy: $1.8\text{ mm}<f*\tan(FOV/4)<2.2\text{ mm}$.

In an exemplary embodiment of the present disclosure, a combined focal length f123 of the first lens element, the second lens element and the third lens element and a combined focal length f567 of the fifth lens element, the sixth lens element and the seventh lens element satisfy: $-1.7<f123/f567<-0.2$.

In an exemplary embodiment of the present disclosure, an axial distance SAG12 from an intersection point of the image-side surface of the first lens element on the second optical axis to a vertex of an effective radius of the image-side surface of the second lens element, and an air spacing T12 between the first lens element and the second lens element on the second optical axis satisfy: $0.9<SAG12/T12<1.4$.

In an exemplary embodiment of the present disclosure, an effective focal length f8 of the eighth lens element and an axial distance SAG81 from an intersection point of an object-side surface of the eighth lens element on the second optical axis to a vertex of an effective radius of the object-side surface of the eighth lens element satisfy: $5.0<f8/SAG81<5.9$.

In an exemplary embodiment of the present disclosure, a radius of curvature R8 of the image-side surface of the fourth lens element, a radius of curvature R9 of the object-side surface of the fifth lens element, and a combined focal length f45 of the fourth lens element and the fifth lens element satisfy: $0.8<(R8+R9)/f45<1.2$.

In an exemplary embodiment of the present disclosure, the radius of curvature R1 of the object-side surface of the first lens element and an axial distance SAG11 from an intersection point of the object-side surface of the first lens element on the second optical axis to a vertex of an effective radius of the first lens satisfy: $3.1<R1/SAG11<4.7$.

In an exemplary embodiment of the present disclosure, a radius of curvature R13 of the object-side surface of the seventh lens element and a center thickness CT7 of the seventh lens on the second optical axis satisfy: $0.9<R13/CT7<3.2$.

BRIEF DESCRIPTION OF THE DRAWINGS

By reading detailed descriptions of non-limiting embodiments given with reference to the following accompanying drawings, other features, objectives and advantages of the present disclosure will become more apparent. In which:

FIGS. 3A-3C respectively illustrate a longitudinal aberration curve, an astigmatic curve, and a distortion curve of the first optical system according to Embodiment 1 of the present disclosure;

FIG. 4 illustrates a schematic structural diagram of a first optical system according to Embodiment 2 of the present disclosure;

FIGS. 5A-5C respectively illustrate a longitudinal aberration curve, an astigmatic curve, and a distortion curve of the first optical system according to Embodiment 2 of the present disclosure;

FIGS. 7A-7C respectively illustrate a longitudinal aberration curve, an astigmatic curve, and a distortion curve of the first optical system according to Embodiment 3 of the present disclosure;

FIG. 8 illustrates a schematic structural diagram of a first optical system according to Embodiment 4 of the present disclosure;

FIGS. 9A-9C respectively illustrate a longitudinal aberration curve, an astigmatic curve, and a distortion curve of the first optical system according to Embodiment 4 of the present disclosure;

FIGS. 11A-11B respectively illustrate a longitudinal aberration curve and an astigmatic curve of the second optical system according to Embodiment 5 of the present disclosure;

FIG. 12 illustrates a schematic structural diagram of a second optical system according to Embodiment 6 of the present disclosure;

FIGS. 13A-13B respectively illustrate a longitudinal aberration curve and an astigmatic curve of the second optical system according to Embodiment 6 of the present disclosure;

FIG. 14 illustrates a schematic structural diagram of a second optical system according to Embodiment 7 of the present disclosure.

DETAILED DESCRIPTION OF EMBODIMENTS

Figure 1A:
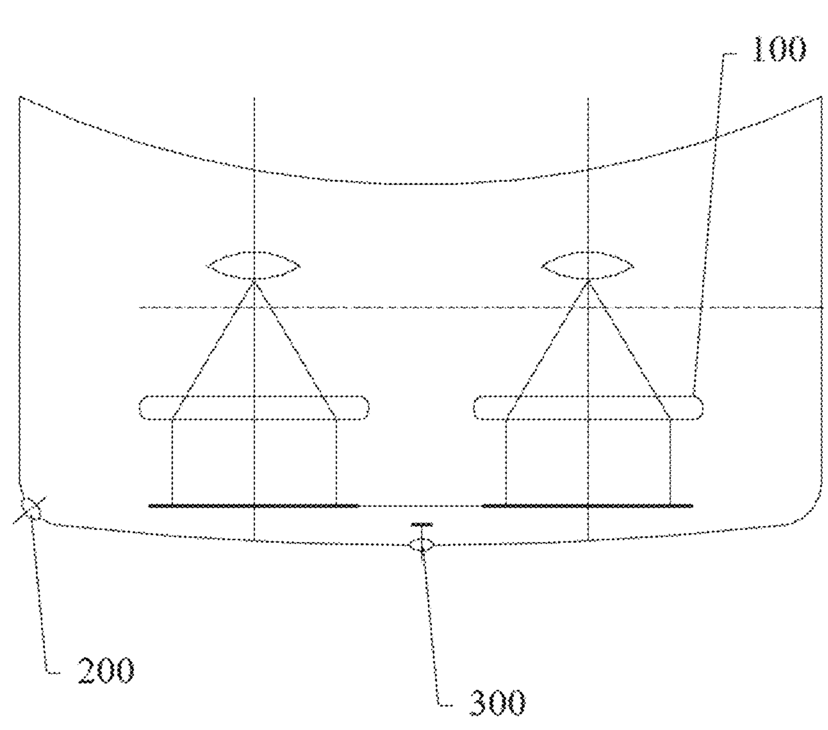
FIG. 1A illustrates a schematic plan view of a virtual reality apparatus according to the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, without departing from the teachings of the present disclosure, the first lens discussed below may also be referred to as the second lens or the third lens, and the first spacing element may also be referred to as the second spacing element or the third spacing element.

In the accompanying drawings, the thicknesses, sizes and shapes of the lenses and/or lens element are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens and/or lens element surface is a convex surface and the position of the convex surface is not defined, it represents that the lens and/or lens element surface is a convex surface at least in the paraxial area. If the lens and/or lens element surface is a concave surface and the position of the concave surface is not defined, it represents that the lens and/or lens element surface is a concave surface at least in the paraxial area. In each lens, a surface closest to the first side (such as the side of the human eye) is referred to as the first-side surface of the lens, and a surface closest to the second side (such as the side of the display screen) is referred to as the second-side surface of the lens. In each lens element, a surface closest to a photographed object is referred to as the object-side surface of the lens element, and a surface closest to an image plane is referred to as the image-side surface of the lens element.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure is described in detail below with reference to the attached drawings and in conjunction with embodiments.

Features, principles and other aspects of the present disclosure are described below in detail.

Figure 1B:
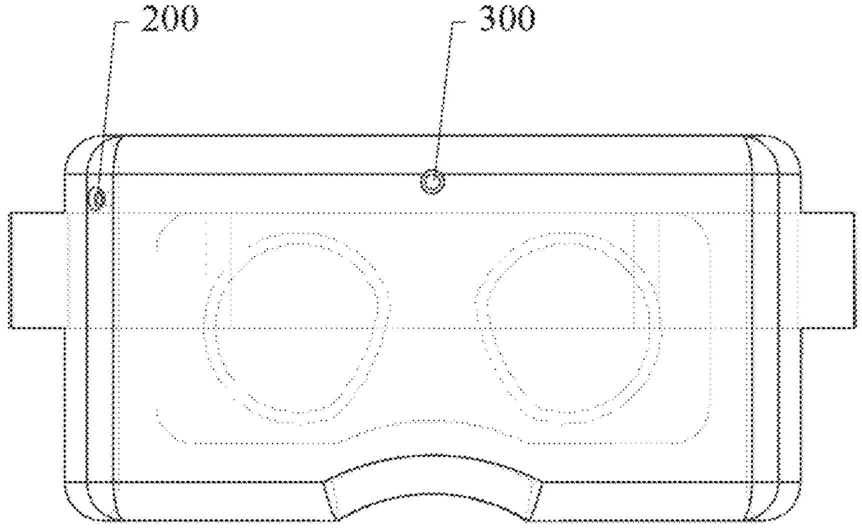
FIG. 1B illustrates a front view of the virtual reality apparatus according to the present disclosure.
Figure 1C:
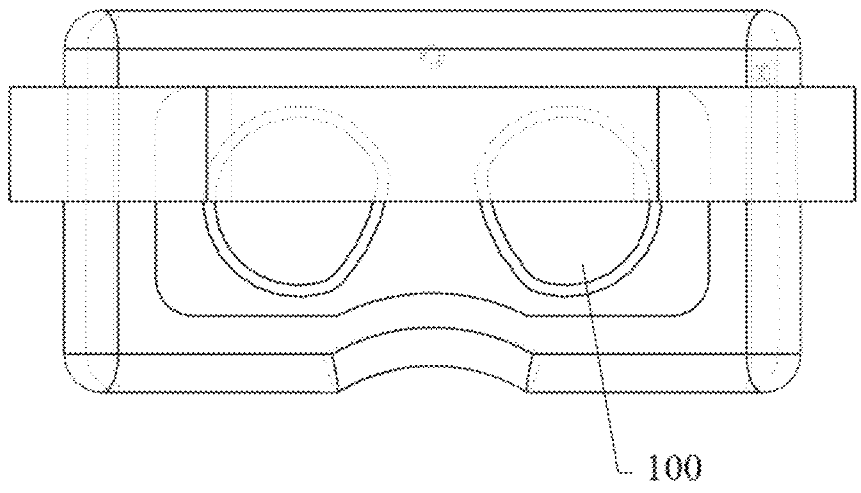
FIG. 1C illustrates a rear view of the virtual reality apparatus according to the present disclosure.

Referring to FIGS. 1A-1C, a first aspect of the present disclosure provides a virtual reality apparatus, which may include a first optical system and a second optical system. The second optical system is used to image a real-world scene (e.g., a picture in a surrounding environment or a user's position and posture), and a resulting real image is transmitted to a display screen on a second side of the first optical system in the form of an electrical signal. The first optical system is used to project a virtual image of the display screen and the real image transmitted to the display screen, where the virtual image refers to a virtual representation of the display screen. By combining the first optical system and the second optical system, virtual reality integration in the virtual reality apparatus can be achieved. The first optical system may be configured as a catadioptric optical system, the number of which may be one or more. The second optical system may be configured as a positioning optical system, the number of which may be one or more. In an example, the virtual reality apparatus may include two first optical systems symmetrically disposed. In an example, the virtual reality apparatus may further include a third optical system.

In the exemplary implementations, the first optical system may include a first lens, a reflective polarizing element, a quarter wave plate, a second lens, and a third lens arranged sequentially along a first optical axis from a first side to a second side. Here, the first lens may have a positive refractive power, the second lens may have a positive refractive power or a negative refractive power, and the third lens may have a positive refractive power. The first optical system in the present disclosure includes three lenses and two polarizing elements, and the polarizing elements may change a polarization characteristic of light, which may not only achieve a function of optical path refraction and reflection, but also preserve light efficiency and improve a brightness entering the eyes.

In the exemplary implementations, a first side surface of the first lens may be a convex surface or a concave surface, and a second side surface of the first lens may be a convex surface. A first side surface of the second lens may be a convex surface or a concave surface, and a second side surface of the second lens may be a planar surface or a concave surface or a convex surface. A first side surface of the third lens may be a planar surface or a convex surface, and a second side surface of the third lens may be a convex surface.

In the exemplary implementations, the first side may be a human eye side, and the second side may be a display screen side. Correspondingly, the first side surface of each element (the first lens, the second lens, the third lens, the reflective polarizing element, the quarter wave plate) may be referred to as a near-human eye side surface, and the second side surface may be referred to as a near-screen side surface.

In the exemplary implementations, the reflective polarizing element is laminated with the quarter wave plate and is adhered to the second side surface of the first lens. Here, compared to the quarter wave plate, the reflective polarizing element is closer to the second side surface of the first lens. By combining the reflective polarizing element and the quarter wave plate together and forming a single film layer, the number of adhesion surfaces of the film layer can be reduced, thereby improving an adhesion yield of the film layer.

In the exemplary implementations, the first optical system may further include a partially reflective layer, which may be adhered to the second side surface of the third lens. The partially reflective layer has a semi-transmissive and semi-reflective effect on the light. By providing the partially reflective layer on the second side surface of the third lens and combining with the reflective polarizing element and the quarter wave plate, the light can be refracted and reflected a number of times, thereby effectively reducing a body length of the first optical system.

In the exemplary implementations, the first optical system may further include a first diaphragm, and the first diaphragm may be disposed, for example, between the first side and the first lens. After being refracted and reflected a number of times by the third lens, the second lens, the quarter wave plate, the reflective polarizing element, the first lens, or the like, image light on the display screen is finally projected into the user's eyes.

In the exemplary implementations, an image surface may be provided on the second side of the first optical system. For example, the image surface may be provided with a display screen. Image light from the display screen may sequentially pass through the third lens, the second lens, the quarter wave plate and reach the reflective polarizing element located on the second side surface of the first lens, and is reflected at the reflective polarizing element to form a first reflected image light. The first reflected image light passes through the quarter wave plate, the second lens, the third lens and reaches the partially reflective layer located on the second side surface of the third lens, and is reflected at the partially reflective layer to form a second reflected image light. The second reflected image light sequentially passes through the third lens, the second lens, the quarter wave plate, the reflective polarizing element, the first lens to the first diaphragm, and is finally projected into the user's eyes. The first optical system provided in the present disclosure effectively shortens the body length of the first optical system by folding a required optical path length through a combination of light reflection and refraction, without compromising a projection quality.

In the exemplary implementations, the second optical system may include a first lens element, a second lens element, a third lens element, a fourth lens element, a fifth lens element, a sixth lens element, a seventh lens element, and an eighth lens element sequentially arranged along a second optical axis from an object side to an image side. There may be an air spacing between any two adjacent lenses from the first lens element to the eighth lens element.

In the exemplary implementations, the first lens element may have a negative refractive power, an object-side surface of the first lens element is a convex surface, and an image-side surface of the first lens element is a concave surface.

In the exemplary implementations, the second lens element may have a negative refractive power, an object-side surface of the second lens element is a convex surface or a concave surface, and an image-side surface of the second lens element is a concave surface.

In the exemplary implementations, the third lens element may have a positive refractive power, an object-side surface of the third lens element is a convex surface or a concave surface, and an image-side surface of the third lens element is a convex surface or a concave surface.

In the exemplary implementations, the fourth lens element may have a positive refractive power, an object-side surface of the fourth lens element is a convex surface or a concave surface, and an image-side surface of the fourth lens element is a convex surface.

In the exemplary implementations, the fifth lens element may have a positive refractive power or a negative refractive power, an object-side surface of the fifth lens element is a convex surface, and an image-side surface of the fifth lens element is a convex surface or a concave surface.

In the exemplary implementations, the sixth lens element may have a negative refractive power, an object-side surface of the sixth lens element is a concave surface, and an image-side surface of the sixth lens element is a convex surface or a concave surface.

In the exemplary implementations, the seventh lens element may have a positive refractive power, an object-side surface of the seventh lens element is a convex surface, and an image-side surface of the seventh lens element is a convex surface.

In the exemplary implementations, the eighth lens element may have a positive refractive power or a negative refractive power, an object-side surface of the eighth lens element is a convex surface or a concave surface, and an image-side surface of the eighth lens element is a convex surface or a concave surface.

In the exemplary implementations, the second optical system may further include a second diaphragm, and the second diaphragm may be disposed between the third lens element and the fourth lens element. By forming a Gaussian-like architecture between the third lens element and the fourth lens element, a vertical axial aberration of the second optical system may be effectively reduced.

In the exemplary implementations, a total effective focal length f' of the first optical system, a radius of curvature R1' of a first side surface of the first lens, a total effective focal length f of the second optical system, and a radius of curvature R1 of the object-side surface of the first lens element may satisfy: $-0.2<(f'/R1')/(f/R1)<1.3$. By reasonably controlling the interrelationship among the total effective focal length of the first optical system, the radius of curvature of the first side surface of the first lens, the total effective focal length of the second optical system, and the radius of curvature of the object-side surface of the first lens element, the first side surface of the first lens can have a large radius of curvature, which is conducive to controlling planarization of the second side surface of the first lens, thereby improving a lamination yield; the object-side surface of the first lens element can also have a small radius of curvature, which is conducive to converging light in a large field-of-view, thereby enlarging a field-of-view of the second optical system.

In the exemplary implementations, an effective focal length f1' of the first lens, an entrance pupil diameter EPD' of the first optical system, an effective focal length f1 of the first lens element, and an entrance pupil diameter EPD of the second optical system may satisfy: $-0.4<(EPD'/f1')/(EPD/f1)<-0.1$. By reasonably controlling the interrelationship among the effective focal length of the first lens, the entrance pupil diameter of the first optical system, the effective focal length of the first lens element, and the entrance pupil diameter of the second optical system, the effective focal length of the first lens of the first optical system can be positive, which is conducive to converging light, thereby decreasing diameters of the second lens and the third lens; at the same time, the effective focal length of the first lens element of the second optical system can be negative, which is conducive to a wide-angle characteristic of the second optical system.

In the exemplary implementations, a distance TD' from the first side surface of the first lens to the second side surface of the third lens on the first optical axis, a center thickness CT1' of the first lens on the first optical axis, a distance TD from the object-side surface of the first lens element to the image-side surface of the eighth lens element on the second optical axis, and a center thickness CT1 of the first lens element on the second optical axis may satisfy: $0<(TD'/CT1')/(TD/CT1)<0.25$. By reasonably controlling the interrelationship among the distance from the first side surface of the first lens to the second side surface of the third lens on the first optical axis, the center thickness of the first lens on the first optical axis, the distance from the object-side surface of the first lens element to the image-side surface of the eighth lens element on the second optical axis, and the center thickness of the first lens element on the second optical axis, a ratio of the number of lenses in the first optical system can be equivalent to a ratio of the number of lenses in the second optical system, ensuring the molding feasibility and assembly stability for both the first lens of the first optical system and the first lens element of the second optical system.

In the exemplary implementations, a sum of center thicknesses ΣCT' of lenses from the first lens to the third lens on the first optical axis, a sum of center thicknesses ΣCT of lenses from the first lens element to the eighth lens element on the second optical axis, the total effective focal length f' of the first optical system and the total effective focal length f of the second optical system may satisfy: $0.1<(\Sigma CT'/f')/(\Sigma CT/f)<0.4$. By reasonably controlling the interrelationship among the sum of center thicknesses of the lenses from the first lens to the third lens on the first optical axis, the sum of center thicknesses of the lenses from the first lens element to the eighth lens element on the second optical axis, the total effective focal length of the first optical system and the total effective focal length of the second optical system, field-of-views of the two optical systems can be indirectly controlled, such that the field-of-view of the second optical system is larger than the field-of-view of the first optical system, so that the second optical system satisfies an ultra-wide-angle characteristic.

In the exemplary implementations, a combined focal length f23' of the second lens and the third lens and the effective focal length f1' of the first lens may satisfy: $0.2\leq f23'/f1'<1.3$. By controlling the ratio of the combined focal length of the second lens and the third lens to the effective focal length of the first lens, refractive powers of the first optical system can be reasonably distributed, and the effective focal length of the first optical system can be indirectly controlled, so that the field-of-view of the first optical system can be within a range of 90° to 1000.

In the exemplary implementations, an effective focal length f2' of the second lens and an effective focal length f3' of the third lens may satisfy: $0<f3'/|f2'|<0.65$. By controlling the ratio of the effective focal length of the third lens to the absolute value of the effective focal length of the second lens, and combining double-cemented-like characteristics of the second lens and the third lens, a chromatic aberration of the first optical system may be effectively controlled.

In the exemplary implementations, a radius of curvature R2' of the second side surface of the first lens and the radius of curvature R1' of the first side surface of the first lens may satisfy: $-1.8<R2'/R1'<0.3$. Controlling the ratio of the radius of curvature of the second side surface of the first lens to the radius of curvature of the first side surface of the first lens, is conducive to constraining an edge thickness of the first lens, thereby ensuring molding feasibility of the first lens.

In the exemplary implementations, a center thickness CT2' of the second lens on the first optical axis and a center thickness CT3' of the third lens on the first optical axis may satisfy: $4.7<CT3'/CT2'<9.3$. By controlling the ratio of the center thickness of the third lens to the center thickness of the second lens, the low-refractive-index third lens can have a large center thickness, which is conducive to balancing the optical path length of light through the second lens and the third lens, and reducing the chromatic aberration of the first optical system.

In the exemplary implementations, the total effective focal length f of the second optical system and a maximal field-of-view FOV of the second optical system may satisfy: $1.8\text{ mm}<f*\tan(FOV/4)<2.2\text{ mm}$. Reasonably controlling the interrelationship between the total effective focal length and the maximal field-of-view of the second optical system can constrain an image height of the second optical system, and is conducive to controlling chip selection of the second optical system.

In the exemplary implementations, a combined focal length f123 of the first lens element, the second lens element and the third lens element and a combined focal length f567 of the fifth lens element, the sixth lens element and the seventh lens element may satisfy: $-1.7<f123/f567<-0.2$. By controlling the ratio of the combined focal length of the first lens element, the second lens element, and the third lens element to the combined focal length of the fifth lens element, the sixth lens element and the seventh lens element, the combined focal length from the first lens element to the third lens element can be negative, the combined focal length from the fifth lens element to the seventh lens element can be positive, which is conducive to maximizing the field-of-view of the second optical system, and combining the above positive and negative focal lengths is conducive to reducing aberrations and improving an imaging quality of the second optical system.

In the exemplary implementations, an axial distance SAG12 from an intersection point of the image-side surface of the first lens element on the second optical axis to a vertex of an effective radius of the image-side surface of the second lens element and an air spacing T12 between the first lens element and the second lens element on the second optical axis may satisfy: $0.9<SAG12/T12<1.4$. By controlling the ratio of a sagittal height of the image-side surface of the first lens element to the air spacing between the first lens element and the second lens element on the second optical axis, and making the ratio equivalent, assembly support between the object-side surface of the second lens element and the image-side surface of the first lens element is facilitated.

In the exemplary implementations, an effective focal length f8 of the eighth lens element and an axial distance SAG81 from an intersection point of the object-side surface of the eighth lens element on the second optical axis to a vertex of an effective radius of the object-side surface of the eighth lens element may satisfy: $5.0<f8/SAG81<5.9$. By controlling the ratio of the effective focal length of the eighth lens element to a sagittal height of the object-side surface of the eighth lens element, a center thickness of the eighth lens element and a sagittal height of the image-side surface of the eighth lens element can be indirectly controlled, and the effective focal length of the eighth lens element can be large, so as to effectively reduce a height of an edge field-of-view on an image plane, reduce an angle of principle light rays in the edge field-of-view, and facilitate chip miniaturization and chip matching.

In the exemplary implementations, a radius of curvature R8 of the image-side surface of the fourth lens element, a radius of curvature R9 of the object-side surface of the fifth lens element, and a combined focal length f45 of the fourth lens element and the fifth lens element may satisfy: $0.8<(R8+R9)/f45<1.2$. By controlling the ratio of the sum of the radii of curvature of the image-side surface of the fourth lens element and the object-side surface of the fifth lens element to the combined focal length of the fourth lens element and the fifth lens element, shapes of the fourth lens element and the fifth lens element can be indirectly constrained, so that the fourth lens element, the fifth lens element and the second lens element and the third lens element form a Gaussian-like structure, which is conducive to optimizing a lateral aberration of the second optical system.

In the exemplary implementations, the radius of curvature R1 of the object-side surface of the first lens element and an axial distance SAG11 from an intersection point of the object-side surface of the first lens element on the second optical axis to a vertex of an effective radius of the first lens may satisfy: $3.1<R1/SAG11<4.7$. By controlling the ratio of the radius of curvature of the object-side surface of the first lens element to a sagittal height of the object-side surface of the first lens element, changes in the sagittal height of the object-side surface of the first lens element due to an aspheric coefficient can be small, which is conducive to lowering sensitivity of the first lens element, and to improving a yield of the second optical system.

In the exemplary implementations, a radius of curvature R13 of the object-side surface of the seventh lens element and a center thickness CT7 of the seventh lens on the second optical axis may satisfy: $0.9<R13/CT7<3.2$. Controlling the ratio of the radius of curvature of the object-side surface of the seventh lens element to the center thickness of the seventh lens on the second optical axis, is conducive to controlling changes in surface type of the seventh lens element after assembly, thereby improving the performance after trustworthiness.

The virtual reality apparatus according to the above implementations of the present disclosure may include the first optical system and the second optical system, where the first optical system may use a plurality of lenses, such as three lenses as described above, and the second optical system may use a plurality of lens elements, such as eight lens elements as described above. By reasonably configuring the parameters of the first optical system and the second optical system, an imaging quality and visual immersion of the virtual reality apparatus can be improved. Moreover, the virtual reality apparatus configured as above has characteristics such as miniaturization and good imaging quality, and can well satisfy the usage requirements of various types of portable electronic products in projection scenarios.

In the implementations of the present disclosure, at least one of the surfaces of each of the first lens to the third lens is an aspheric surface. An aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. Similarly, at least one of the surfaces of each of the first lens element to the eighth lens element is an aspheric surface.

However, it should be understood by those skilled in the art that the various results and advantages described in the present specification may be obtained by changing the number of the lenses/lens elements constituting the visual reality apparatus without departing from the technical solution claimed by the present disclosure.

Referring to FIGS. 1A-1C, a second aspect of the present disclosure provides a virtual reality apparatus, which may include a first optical system and a second optical system; the first optical system sequentially includes, along a first optical axis from a first side to a second side, a first lens having a positive refractive power, a reflective polarizing element, a quarter wave plate, a second lens having a refractive power and a third lens having a positive refractive power; the second optical system sequentially includes, along a second optical axis from an object side to an image side: a first lens element having a negative refractive power; a second lens element having a negative refractive power; a third lens element having a positive refractive power; a fourth lens element having a positive refractive power; a fifth lens element having a refractive power; a sixth lens element having a negative refractive power; a seventh lens element having a positive refractive power; and an eighth lens element having a refractive power; where, a real image formed by the second optical system is transmitted in a form of an electrical signal to a display screen on the second side of the first optical system, and the first optical system is used to project an imaginary image of the display screen and the real image transmitted to the display screen.

Here, an effective focal length f1' of the first lens, an entrance pupil diameter EPD' of the first optical system, an effective focal length f1 of the first lens element, and an entrance pupil diameter EPD of the second optical system may satisfy: $-0.4<(EPD'/f1')/(EPD/f1)<-0.1$. The virtual reality apparatus provided in the present disclosure is configured in the form of a structure combining the first optical system and the second optical system, where the first optical system includes three lenses and two polarizing elements, and the polarizing elements may change a polarization characteristic of light, which may not only achieve a function of optical path refraction and reflection, but also preserve light efficiency and improve the brightness entering the eyes. At the same time, by controlling the interrelationship among the effective focal length of the first lens, the entrance pupil diameter of the first optical system, the effective focal length of the first lens element, and the entrance pupil diameter of the second optical system, the effective focal length of the first lens of the first optical system can be positive, which is conducive to converging light, thereby decreasing diameters of the second lens and the third lens; and the effective focal length of the first lens element of the second optical system can be negative, which is conducive to a wide-angle characteristic of the second optical system.

Specific embodiments of the first optical system that may be applicable to the above implementations are further described below with reference to the accompanying drawings.

Embodiment 1

A first optical system according to Embodiment 1 of the present disclosure is described below with reference to FIG. 2 to FIG. 3C.

Figure 2:
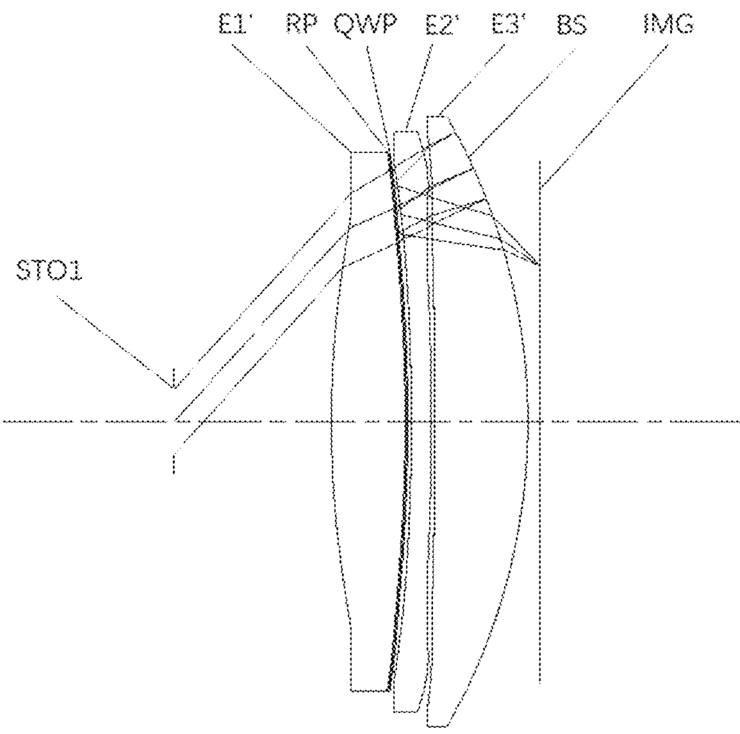
FIG. 2 illustrates a schematic structural diagram of a first optical system according to Embodiment 1 of the present disclosure.

As shown in FIG. 2, the first optical system 100 includes a first lens E1', a reflective polarizing element RP, a quarter wave plate QWP, a second lens E2', and a third lens E3' arranged sequentially along a first optical axis from a first side to a second side. A first diaphragm STO1 may be provided between the first side and the first lens E1'. A partially reflective layer BS may be provided on a second side surface of the third lens E3'. In this embodiment, the first side refers to a human eye side, and the second side refers to a display screen side. A first side surface of each element (the first lens E1', the reflective polarizing element RP, the quarter wave plate QWP, the second lens E2', and the third lens E3') is referred to as a near-human eye side surface, and a second side surface of each element is referred to as a near-screen side surface.

The first lens E1' has a positive refractive power, a near-human eye side surface S1 of the first lens E1' is a convex surface, and a near-screen side surface S2 of the first lens E1' is a convex surface. The reflective polarizing element RP has a near-human eye side surface and a near-screen side surface, and the near-human eye side surface of the reflective polarizing element RP is adhered to the near-screen side surface S2 of the first lens E1'. The quarter wave plate QWP has a near-human eye side surface and a near-screen side surface, and the near-human eye side surface of the quarter wave plate QWP is adhered to the near-screen side surface of the reflective polarizing element RP. The second lens E2' has a negative refractive power, a near-human eye side surface S3 of the second lens E2' is a concave surface, and a near-screen side surface S4 of the second lens E2' is a convex surface. The third lens E3' has a positive refractive power, a near-human eye side surface S5 of the third lens E3' is a convex surface, and a near-screen side surface S6 of the third lens E3' is a convex surface. The partially reflective layer BS may be adhered to the near-screen side surface S6 of the third lens E3'.

An image surface IMG may be provided on the second side of the first optical system 100, and the image surface IMG may be provided with a display screen. Image light from the image surface IMG sequentially passes through the third lens E3', the second lens E2', the quarter wave plate QWP and reaches the reflective polarizing element RP located on the near-screen side surface S2 of the first lens E1', and is reflected for the first time at the reflective polarizing element RP. The light reflected for the first time passes through the quarter wave plate QWP, the second lens E2', the third lens E3' and reaches the partially reflective layer BS located on the near-screen side surface S6 of the third lens E3', and is reflected for the second time at the partially reflective layer BS. The light reflected for the second time sequentially passes through the third lens E3', the second lens E2', the quarter wave plate QWP, the reflective polarizing element RP, the first lens E1' to the first diaphragm STO1, and is finally projected into a user's eyes. For example, the light from this first optical system 100 after two reflections is finally projected into the user's eyes.

Table 1 shows a table of basic parameters of the first optical system in Embodiment 1. Here, the units of a radius of curvature, a thickness/distance are all millimeters (mm). The image light from the image surface IMG passes through each element in an order of serial number 19 to serial number 1 and is finally projected into human eyes.

TABLE 1

| serial number | surface number | element | surface type | radius of curvature | thickness/ distance | material | | refraction/ reflection |
|---|---|---|---|---|---|---|---|---|
| | | | | | | refractive index | abbe number | |
| | | | spherical | infinite | −1290.0000 | | | refraction |
| 1 | STO1 | STO1 | spherical | infinite | 12.0000 | | | refraction |
| 2 | S1 | first lens | aspheric | 78.2443 | 5.6495 | 1.546 | 55.92 | refraction |
| 3 | S2 | reflective polarizing element | aspheric | −133.9283 | 0.1000 | 1.502 | 56.00 | refraction |
| 4 | | quarter wave plate | aspheric | −133.9283 | 0.1000 | 1.502 | 56.00 | refraction |
| 5 | | | aspheric | −133.9283 | 0.2605 | | | refraction |
| 6 | S3 | second lens | aspheric | −200.0000 | 1.4997 | 1.546 | 55.92 | refraction |
| 7 | S4 | | aspheric | −1055.3909 | 0.2500 | | | refraction |
| 8 | S5 | third lens | aspheric | 897.7500 | 7.1657 | 1.546 | 55.92 | refraction |
| 9 | S6 | partially reflective layer | aspheric | −47.3077 | −7.1657 | 1.546 | 55.92 | reflection |
| 10 | | | aspheric | 897.7500 | −0.2500 | | | refraction |
| 11 | | second lens | aspheric | −1055.3909 | −1.4997 | | | refraction |
| 12 | | | aspheric | −200.0000 | −0.2605 | | | refraction |
| 13 | | quarter wave plate | aspheric | −133.9283 | −0.1000 | 1.502 | 56.00 | refraction |
| 14 | | reflective polarizing element | aspheric | −133.9283 | 0.1000 | 1.502 | 56.00 | reflection |
| 15 | | | aspheric | −133.9283 | 0.2605 | | | refraction |
| 16 | S3 | second lens | aspheric | −200.0000 | 1.4997 | 1.546 | 55.92 | refraction |
| 17 | S4 | | aspheric | −1055.3909 | 0.2500 | | | refraction |
| 18 | S5 | third lens | aspheric | 897.7500 | 7.1657 | 1.546 | 55.92 | refraction |
| 19 | S6 | | aspheric | −47.3077 | 0.8652 | | | refraction |
| | IMG | image surface | spherical | infinite | 0.0000 | | | refraction |

In the present embodiment, the near-human eye side surface S1 and the near-screen side surface S2 of the first lens E1', the near-human eye side surface S3 and the near-screen side surface S4 of the second lens E2', and the near-human eye side surface S5 and the near-screen side surface S6 of the third lens E3' are aspheric surfaces, the surface type x of each aspheric lens may be defined using, but not limited to, the following aspheric formula:

$$x = \frac{ch^2}{1 + \sqrt{1 - (k+1)c^2h^2}} + \sum Aih^i \tag{1}$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Table 2 gives the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S6 in Embodiment 1.

TABLE 2

| surface number | $A_4$ | $A_6$ | $A_8$ | $A_{10}$ |
|---|---|---|---|---|
| S1 | −2.3507E−01 | −7.2111E−02 | −4.9613E−02 | −5.2795E−04 |
| S2 | 1.6857E−01 | 1.5702E−02 | 1.5198E−03 | −6.4110E−04 |
| S2 | −4.4543E−01 | 2.4933E−02 | −1.3528E−03 | 2.6530E−03 |
| S4 | −2.3022E−01 | 1.5647E−01 | −2.4706E−01 | 3.1457E−02 |

TABLE 2-continued

| | | | | | |
|---|---|---|---|---|---|
| S5 | −6.4525E−01 | 1.5977E−01 | −1.1449E−01 | 1.5670E−02 | |
| S6 | 6.3214E−03 | −1.1485E−02 | −1.2245E−03 | 0.0000E+00 | |
| surface number | $A_{12}$ | $A_{14}$ | $A_{16}$ | $A_{18}$ | $A_{20}$ |
| S1 | −7.3031E−03 | 1.7584E−04 | −4.7630E−04 | 0.0000E+00 | 0.0000E+00 |
| S2 | −2.8373E−03 | 1.3518E−04 | 1.1613E−04 | 0.0000E+00 | 0.0000E+00 |
| S2 | −7.6516E−03 | 1.9565E−03 | 1.7073E−03 | 0.0000E+00 | 0.0000E+00 |
| S4 | −3.8328E−04 | −9.1639E−03 | 2.8351E−03 | 0.0000E+00 | 0.0000E+00 |
| S5 | 6.5357E−03 | −4.8091E−03 | 1.2567E−03 | 0.0000E+00 | 0.0000E+00 |
| S6 | 0.0000E+00 | 0.0000E+00 | 0.0000E+00 | 0.0000E+00 | 0.0000E+00 |

FIG. 3A illustrates a longitudinal aberration curve of the first optical system 100 in Embodiment 1, representing deviations of focal points at which lights of different wavelengths passing through the first optical system converge. FIG. 3B illustrates an astigmatic curve of the first optical system 100 in Embodiment 1, representing a curvature of a tangential image plane and a curvature of a sagittal image plane. FIG. 3C illustrates a distortion curve of the first optical system 100 in Embodiment 1, representing amounts of distortion corresponding to different field-of-views. It can be seen from FIGS. 3A-3C that the first optical system 100 given in Embodiment 1 can achieve a good imaging quality.

Embodiment 2

A first optical system according to Embodiment 2 of the present disclosure is described below with reference to FIG. 4 to FIG. 5C.

As shown in FIG. 4, the first optical system 100 includes a first lens E1', a reflective polarizing element RP, a quarter wave plate QWP, a second lens E2', and a third lens E3' arranged sequentially along a first optical axis from a first side to a second side. A first diaphragm STO1 may be provided between the first side and the first lens E1'. A partially reflective layer BS may be provided on a second side surface of the third lens E3'. In this embodiment, the first side refers to a human eye side, and the second side refers to a display screen side. A first side surface of each element (the first lens E1', the reflective polarizing element RP, the quarter wave plate QWP, the second lens E2', and the third lens E3') is referred to as a near-human eye side surface, and a second side surface of each element is referred to as a near-screen side surface.

The first lens E1' has a positive refractive power, a near-human eye side surface S1 of the first lens E1' is a concave surface, and a near-screen side surface S2 of the first lens E1' is a convex surface. The reflective polarizing element RP has a near-human eye side surface and a near-screen side surface, and the near-human eye side surface of the reflective polarizing element RP is adhered to the near-screen side surface S2 of the first lens E1'. The quarter wave plate QWP has a near-human eye side surface and a near-screen side surface, and the near-human eye side surface of the quarter wave plate QWP is adhered to the near-screen side surface of the reflective polarizing element RP. The second lens E2' has a negative refractive power, a near-human eye side surface S3 of the second lens E2' is a concave surface, and a near-screen side surface S4 of the second lens E2' is a planar surface. The third lens E3' has a positive refractive power, a near-human eye side surface S5 of the third lens E3' is a planar surface, and a near-screen side surface S6 of the third lens E3' is a convex surface. The partially reflective layer BS may be adhered to the near-screen side surface S6 of the third lens E3'.

An image surface IMG may be provided on the second side of the first optical system 100, and the image surface IMG may be provided with a display screen. Image light from the image surface IMG sequentially passes through the third lens E3', the second lens E2', the quarter wave plate QWP and reaches the reflective polarizing element RP located on the near-screen side surface S2 of the first lens E1', and is reflected for the first time at the reflective polarizing element RP. The light reflected for the first time passes through the quarter wave plate QWP, the second lens E2', the third lens E3' and reaches the partially reflective layer BS located on the near-screen side surface S6 of the third lens E3', and is reflected for the second time at the partially reflective layer BS. The light reflected for the second time sequentially passes through the third lens E3', the second lens E2', the quarter wave plate QWP, the reflective polarizing element RP, the first lens E1' to the first diaphragm STO1, and is finally projected into a user's eyes. For example, the light from this first optical system 100 after two reflections is finally projected into the user's eyes.

Table 3 shows a table of basic parameters of the first optical system in Embodiment 2. Here, the units of a radius of curvature, a thickness/distance are all millimeters (mm). The image light from the image surface MG passes through each element in an order of serial number 19 to serial number 1 and is finally projected into human eyes.

TABLE 3

| serial number | surface number | element | surface type | radius of curvature | thickness/ distance | material: refractive index | material: abbe number | refraction/ reflection |
|---|---|---|---|---|---|---|---|---|
| | | | spherical | infinite | −1290.0000 | | | refraction |
| 1 | STO1 | STO1 | spherical | infinite | 12.0000 | | | refraction |
| 2 | S1 | first lens | aspheric | −500.0000 | 3.8000 | 1.546 | 55.92 | refraction |
| 3 | S2 | reflective polarizing element | aspheric | −80.0000 | 0.1000 | 1.502 | 56.00 | refraction |

TABLE 3-continued

| serial number | surface number | element | surface type | radius of curvature | thickness/ distance | material refractive index | material abbe number | refraction/ reflection |
|---|---|---|---|---|---|---|---|---|
| 4 | | quarter wave plate | aspheric | −80.0000 | 0.1000 | 1.502 | 56.00 | refraction |
| 5 | | | aspheric | −80.0000 | 0.2500 | | | refraction |
| 6 | S3 | second lens | aspheric | −67.2561 | 0.8998 | 1.645 | 23.52 | refraction |
| 7 | S4 | | spherical | infinite | 0.0000 | | | refraction |
| 8 | S5 | third lens | spherical | infinite | 8.2802 | 1.546 | 55.92 | refraction |
| 9 | S6 | partially reflective layer | aspheric | −36.6342 | −8.2802 | 1.546 | 55.92 | reflection |
| 10 | | | spherical | infinite | 0.0000 | | | refraction |
| 11 | | second lens | spherical | infinite | −0.8998 | | | refraction |
| 12 | | | aspheric | −67.2561 | −0.2500 | | | refraction |
| 13 | | quarter wave plate | aspheric | −80.0000 | −0.1000 | 1.502 | 56.00 | refraction |
| 14 | | reflective polarizing element | aspheric | −80.0000 | 0.1000 | 1.502 | 56.00 | reflection |
| 15 | | | aspheric | −80.0000 | 0.2500 | | | refraction |
| 16 | S3 | second lens | aspheric | −67.2561 | 0.8998 | 1.645 | 23.52 | refraction |
| 17 | S4 | | spherical | infinite | 0.0000 | | | refraction |
| 18 | S5 | third lens | spherical | infinite | 8.2802 | 1.546 | 55.92 | refraction |
| 19 | S6 | | aspheric | −36.6342 | 0.8456 | | | refraction |
| | IMG | image surface | spherical | infinite | 0.0000 | | | refraction |

In the present embodiment, the near-human eye side surface S1 and the near-screen side surface S2 of the first lens E1', the near-human eye side surface S3 of the second lens E2', and the near-screen side surface S6 of the third lens E3' are aspheric surfaces. Table 4 gives the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S3 and S6 in Embodiment 2.

TABLE 4

| surface number | $A_4$ | $A_6$ | $A_8$ | $A_{10}$ |
|---|---|---|---|---|
| S1 | −1.1214E+00 | −3.3129E−01 | −9.6209E−02 | −2.3497E−02 |
| S2 | −5.2510E−01 | 1.3365E−01 | −3.2642E−02 | 1.2198E−02 |
| S3 | −1.7966E−01 | 1.0059E−01 | 1.7702E−02 | −1.4597E−02 |
| S6 | 6.3214E−03 | −1.1485E−02 | −1.2245E−03 | 0.0000E+00 |

| surface number | $A_{12}$ | $A_{14}$ | $A_{16}$ | $A_{18}$ | $A_{20}$ |
|---|---|---|---|---|---|
| S1 | −1.5886E−02 | 2.7230E−04 | −2.1414E−03 | 0.0000E+00 | 0.0000E+00 |
| S2 | −5.6791E−03 | 1.7956E−03 | −2.8782E−04 | 0.0000E+00 | 0.0000E+00 |
| S3 | 2.2334E−03 | −3.3570E−03 | 6.0729E−04 | 0.0000E+00 | 0.0000E+00 |
| S6 | 0.0000E+00 | 0.0000E+00 | 0.0000E+00 | 0.0000E+00 | 0.0000E+00 |

Figure 5C:
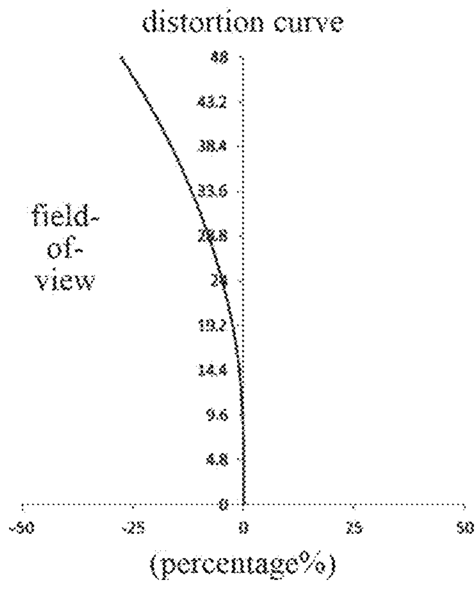

FIG. 5A illustrates a longitudinal aberration curve of the first optical system 100 in Embodiment 2, representing deviations of focal points at which lights of different wavelengths passing through the first optical system converge. FIG. 5B illustrates an astigmatic curve of the first optical system 100 in Embodiment 2, representing a curvature of a tangential image plane and a curvature of a sagittal image plane. FIG. 5C illustrates a distortion curve of the first optical system 100 in Embodiment 2, representing amounts of distortion corresponding to different field-of-views. It can be seen from FIGS. 5A-5C that the first optical system 100 given in Embodiment 2 can achieve a good imaging quality.

Embodiment 3

A first optical system according to Embodiment 3 of the present disclosure is described below with reference to FIG. 6 to FIG. 7C.

Figure 6:
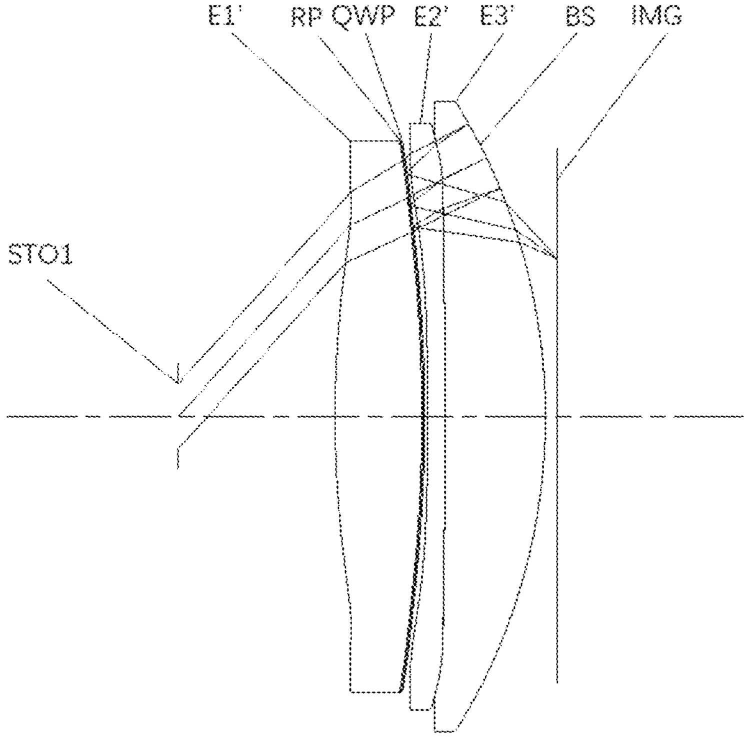
FIG. 6 illustrates a schematic structural diagram of a first optical system according to Embodiment 3 of the present disclosure.

As shown in FIG. 6, the first optical system 100 includes a first lens E1', a reflective polarizing element RP, a quarter wave plate QWP, a second lens E2', and a third lens E3' arranged sequentially along a first optical axis from a first side to a second side. A first diaphragm STO1 may be provided between the first side and the first lens E1'. A partially reflective layer BS may be provided on a second side surface of the third lens E3'. In this embodiment, the first side refers to a human eye side, and the second side refers to a display screen side. A first side surface of each element (the first lens E1', the reflective polarizing element RP, the quarter wave plate QWP, the second lens E2', and the third lens E3') is referred to as a near-human eye side surface, and a second side surface of each element is referred to as a near-screen side surface.

The first lens E1' has a positive refractive power, a near-human eye side surface S1 of the first lens E1' is a convex surface, and a near-screen side surface S2 of the first lens E1' is a convex surface. The reflective polarizing element RP has a near-human eye side surface and a near-screen side surface, and the near-human eye side surface of the reflective polarizing element RP is adhered to the near-screen side surface S2 of the first lens E1'. The quarter wave plate QWP has a near-human eye side surface and a near-screen side surface, and the near-human eye side surface of the quarter wave plate QWP is adhered to the near-screen side surface of the reflective polarizing element RP. The second lens E2' has a negative refractive power, a near-human eye side surface S3 of the second lens E2' is a concave surface, and a near-screen side surface S4 of the second lens E2' is a concave surface. The third lens E3' has a positive refractive power, a near-human eye side surface S5 of the third lens E3' is a convex surface, and a near-screen side surface S6 of the third lens E3' is a convex surface. The partially reflective layer BS may be adhered to the near-screen side surface S6 of the third lens E3'.

An image surface IMG may be provided on the second side of the first optical system 100, and the image surface IMG may be provided with a display screen. Image light from the image surface IMG sequentially passes through the third lens E3', the second lens E2', the quarter wave plate QWP and reaches the reflective polarizing element RP located on the near-screen side surface S2 of the first lens E1', and is reflected for the first time at the reflective polarizing element RP. The light reflected for the first time passes through the quarter wave plate QWP, the second lens E2', the third lens E3' and reaches the partially reflective layer BS located on the near-screen side surface S6 of the third lens E3', and is reflected for the second time at the partially reflective layer BS. The light reflected for the second time sequentially passes through the third lens E3', the second lens E2', the quarter wave plate QWP, the reflective polarizing element RP, the first lens E1' to the first diaphragm STO1, and is finally projected into a user's eyes. For example, the light from this first optical system 100 after two reflections is finally projected into the user's eyes.

Table 5 shows a table of basic parameters of the first optical system in Embodiment 3. Here, the units of a radius of curvature, a thickness/distance are all millimeters (mm). The image light from the image surface IMG passes through each element in an order of serial number 19 to serial number 1 and is finally projected into human eyes.

TABLE 5

| serial number | surface number | element | surface type | radius of curvature | thickness/ distance | material: refractive index | material: abbe number | refraction/ reflection |
|---|---|---|---|---|---|---|---|---|
| | | | spherical | infinite | −1290.0000 | | | refraction |
| 1 | STO1 | STO1 | spherical | infinite | 12.0000 | | | refraction |
| 2 | S1 | first lens | aspheric | 79.3621 | 6.6570 | 1.546 | 55.92 | refraction |
| 3 | S2 | reflective polarizing element | aspheric | −118.3395 | 0.1000 | 1.502 | 56.00 | refraction |
| 4 | | quarter wave plate | aspheric | −118.3395 | 0.1000 | 1.502 | 56.00 | refraction |
| 5 | | | aspheric | −118.3395 | 0.2500 | | | refraction |
| 6 | S3 | second lens | aspheric | −168.5771 | 1.3214 | 1.546 | 55.92 | refraction |
| 7 | S4 | | aspheric | 560.8906 | 0.0000 | | | refraction |
| 8 | S5 | third lens | aspheric | 560.8906 | 7.6755 | 1.546 | 55.92 | refraction |
| 9 | S6 | partially reflective layer | aspheric | −45.5881 | −7.6755 | 1.546 | 55.92 | reflection |
| 10 | | | aspheric | 560.8906 | 0.0000 | | | refraction |
| 11 | | second lens | aspheric | 560.8906 | −1.3214 | | | refraction |
| 12 | | | aspheric | −168.5771 | −0.2500 | | | refraction |
| 13 | | quarter wave plate | aspheric | −118.3395 | −0.1000 | 1.502 | 56.00 | refraction |
| 14 | | reflective polarizing element | aspheric | −118.3395 | 0.1000 | 1.502 | 56.00 | reflection |
| 15 | | | aspheric | −118.3395 | 0.2500 | | | refraction |
| 16 | S3 | second lens | aspheric | −168.5771 | 1.3214 | 1.546 | 55.92 | refraction |
| 17 | S4 | | aspheric | 560.8906 | 0.0000 | | | refraction |
| 18 | S5 | third lens | aspheric | 560.8906 | 7.6755 | 1.546 | 55.92 | refraction |
| 19 | S6 | | aspheric | −45.5881 | 0.9300 | | | refraction |
| | IMG | image surface | spherical | infinite | 0.0000 | | | refraction |

In the present embodiment, the near-human eye side surface S1 and the near-screen side surface S2 of the first lens E1', the near-human eye side surface S3 and the near-screen side surface S4 of the second lens E2', and the near-human eye side surface S5 and the near-screen side surface S6 of the third lens E3' are aspheric surfaces. Table 6 gives the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S6 in Embodiment 3.

TABLE 6

| surface number | $A_4$ | $A_6$ | $A_8$ | $A_{10}$ |
|---|---|---|---|---|
| S1 | −4.8524E−01 | −8.1530E−02 | −4.8933E−02 | 1.0052E−02 |
| S2 | 1.3422E−01 | 2.4111E−02 | 2.1013E−04 | −6.2016E−03 |
| S3 | −3.4535E−01 | 1.3235E−02 | 1.3069E−01 | −3.5501E−02 |
| S4 | −9.7724E−01 | 1.2301E−01 | −2.1000E−01 | 6.4941E−02 |
| S5 | −9.7724E−01 | 1.2301E−01 | −2.1000E−01 | 6.4941E−02 |
| S6 | 6.3214E−03 | −1.1485E−02 | −1.2245E−03 | 0.0000E+00 |

| surface number | $A_{12}$ | $A_{14}$ | $A_{16}$ | $A_{18}$ | $A_{20}$ |
|---|---|---|---|---|---|
| S1 | −1.1256E−02 | 1.9505E−03 | −8.1676E−04 | 0.0000E+00 | 0.0000E+00 |
| S2 | −2.7975E−03 | 4.9328E−04 | 3.3116E−04 | 0.0000E+00 | 0.0000E+00 |
| S3 | 3.8362E−03 | 1.7737E−04 | −2.8648E−04 | 0.0000E+00 | 0.0000E+00 |
| S4 | −1.6673E−02 | 2.5460E−03 | 1.6000E−03 | 0.0000E+00 | 0.0000E+00 |
| S5 | −1.6673E−02 | 2.5460E−03 | 1.6000E−03 | 0.0000E+00 | 0.0000E+00 |
| S6 | 0.0000E+00 | 0.0000E+00 | 0.0000E+00 | 0.0000E+00 | 0.0000E+00 |

FIG. 7A illustrates a longitudinal aberration curve of the first optical system 100 in Embodiment 3, representing deviations of focal points at which lights of different wavelengths passing through the first optical system converge. FIG. 7B illustrates an astigmatic curve of the first optical system 100 in Embodiment 3, representing a curvature of a tangential image plane and a curvature of a sagittal image plane. FIG. 7C illustrates a distortion curve of the first optical system 100 in Embodiment 3, representing amounts of distortion corresponding to different field-of-views. It can be seen from FIGS. 7A-7C that the first optical system 100 given in Embodiment 3 can achieve a good imaging quality.

Embodiment 4

A first optical system according to Embodiment 4 of the present disclosure is described below with reference to FIG. 8 to FIG. 9C.

As shown in FIG. 8, the first optical system 100 includes a first lens E1', a reflective polarizing element RP, a quarter wave plate QWP, a second lens E2', and a third lens E3' arranged sequentially along a first optical axis from a first side to a second side. A first diaphragm STO1 may be provided between the first side and the first lens E1'. A partially reflective layer BS may be provided on a second side surface of the third lens E3'. In this embodiment, the first side refers to a human eye side, and the second side refers to a display screen side. A first side surface of each element (the first lens E1', the reflective polarizing element RP, the quarter wave plate QWP, the second lens E2', and the third lens E3') is referred to as a near-human eye side surface, and a second side surface of each element is referred to as a near-screen side surface.

The first lens E1' has a negative refractive power, a near-human eye side surface S1 of the first lens E1' is a concave surface, and a near-screen side surface S2 of the first lens E1' is a convex surface. The reflective polarizing element RP has a near-human eye side surface and a near-screen side surface, and the near-human eye side surface of the reflective polarizing element RP is adhered to the near-screen side surface S2 of the first lens E1'. The quarter wave plate QWP has a near-human eye side surface and a near-screen side surface, and the near-human eye side surface of the quarter wave plate QWP is adhered to the near-screen side surface of the reflective polarizing element RP. The second lens E2' has a positive refractive power, a near-human eye side surface S3 of the second lens E2' is a convex surface, and a near-screen side surface S4 of the second lens E2' is a planar surface. The third lens E3' has a positive refractive power, a near-human eye side surface S5 of the third lens E3' is a planar surface, and a near-screen side surface S6 of the third lens E3' is a convex surface. The partially reflective layer BS may be adhered to the near-screen side surface S6 of the third lens E3'.

An image surface IMG may be provided on the second side of the first optical system 100, and the image surface IMG may be provided with a display screen. Image light from the image surface IMG sequentially passes through the third lens E3', the second lens E2', the quarter wave plate QWP and reaches the reflective polarizing element RP located on the near-screen side surface S2 of the first lens E1', and is reflected for the first time at the reflective polarizing element RP. The light reflected for the first time passes through the quarter wave plate QWP, the second lens E2', the third lens E3' and reaches the partially reflective layer BS located on the near-screen side surface S6 of the third lens E3', and is reflected for the second time at the partially reflective layer BS. The light reflected for the second time sequentially passes through the third lens E3', the second lens E2', the quarter wave plate QWP, the reflective polarizing element RP, the first lens E1' to the first diaphragm STO1, and is finally projected into a user's eyes. For example, the light from this first optical system 100 after two reflections is finally projected into the user's eyes.

Table 7 shows a table of basic parameters of the first optical system in Embodiment 4. Here, the units of a radius of curvature, a thickness/distance are all millimeters (mm). The image light from the image surface IMG passes through each element in an order of serial number 19 to serial number 1 and is finally projected into human eyes.

TABLE 7

| serial number | surface number | element | surface type | radius of curvature | thickness/ distance | material refractive index | material abbe number | refraction/ reflection |
|---|---|---|---|---|---|---|---|---|
| | | | spherical | infinite | −1290.0000 | | | refraction |
| 1 | STO1 | STO1 | spherical | infinite | 12.0000 | | | refraction |
| 2 | S1 | first lens | aspheric | −500.0000 | 3.3550 | 1.546 | 55.92 | refraction |
| 3 | S2 | reflective polarizing element | aspheric | −109.7362 | 0.1000 | 1.502 | 56.00 | refraction |
| 4 | | quarter wave plate | aspheric | −109.7362 | 0.1000 | 1.502 | 56.00 | refraction |
| 5 | | | aspheric | −109.7362 | 0.2500 | | | refraction |
| 6 | S3 | second lens | aspheric | 1118.8427 | 0.9396 | 1.546 | 55.92 | refraction |
| 7 | S4 | | spherical | infinite | 0.0000 | | | refraction |
| 8 | S5 | third lens | spherical | infinite | 8.3494 | 1.546 | 55.92 | refraction |
| 9 | S6 | partially reflective layer | aspheric | −43.3262 | −8.3494 | 1.546 | 55.92 | reflection |
| 10 | | | spherical | infinite | 0.0000 | | | refraction |
| 11 | | second lens | spherical | infinite | −0.9396 | | | refraction |
| 12 | | | aspheric | 1118.8427 | −0.2500 | | | refraction |
| 13 | | quarter wave plate | aspheric | −109.7362 | −0.1000 | 1.502 | 56.00 | refraction |
| 14 | | reflective polarizing element | aspheric | −109.7362 | 0.1000 | 1.502 | 56.00 | reflection |
| 15 | | | aspheric | −109.7362 | 0.2500 | | | refraction |
| 16 | S3 | second lens | aspheric | 1118.8427 | 0.9396 | 1.546 | 55.92 | refraction |
| 17 | S4 | | spherical | infinite | 0.0000 | | | refraction |
| 18 | S5 | third lens | spherical | infinite | 8.3494 | 1.546 | 55.92 | refraction |
| 19 | S6 | | aspheric | −43.3262 | 0.8644 | | | refraction |
| | IMG | image surface | spherical | infinite | 0.0000 | | | refraction |

In the present embodiment, the near-human eye side surface S1 and the near-screen side surface S2 of the first lens E1', the near-human eye side surface S3 of the second lens E2', and the near-screen side surface S6 of the third lens E3' are aspheric surfaces. Table 8 gives the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S3 and S6 in Embodiment 4.

TABLE 8

| surface number | $A_4$ | $A_6$ | $A_8$ | $A_{10}$ |
|---|---|---|---|---|
| S1 | −9.4583E−01 | −1.9555E−01 | −1.0082E−01 | −4.1586E−02 |
| S2 | 1.4170E−01 | 5.7186E−02 | −4.7677E−03 | −6.3182E−03 |
| S3 | −6.2249E−01 | −3.1748E−02 | 5.9938E−02 | 2.7461E−03 |
| S6 | 6.3214E−03 | −1.1485E−02 | −1.2245E−03 | 0.0000E+00 |

| surface number | $A_{12}$ | $A_{14}$ | $A_{16}$ | $A_{18}$ | $A_{20}$ |
|---|---|---|---|---|---|
| S1 | −1.3268E−02 | −2.4985E−03 | −1.9133E−03 | 0.0000E+00 | 0.0000E+00 |
| S2 | −6.1732E−04 | 9.3834E−04 | −1.7605E−04 | 0.0000E+00 | 0.0000E+00 |
| S3 | −5.0228E−03 | 4.1308E−03 | 4.9000E−03 | 0.0000E+00 | 0.0000E+00 |
| S6 | 0.0000E+00 | 0.0000E+00 | 0.0000E+00 | 0.0000E+00 | 0.0000E+00 |

Figure 9C:
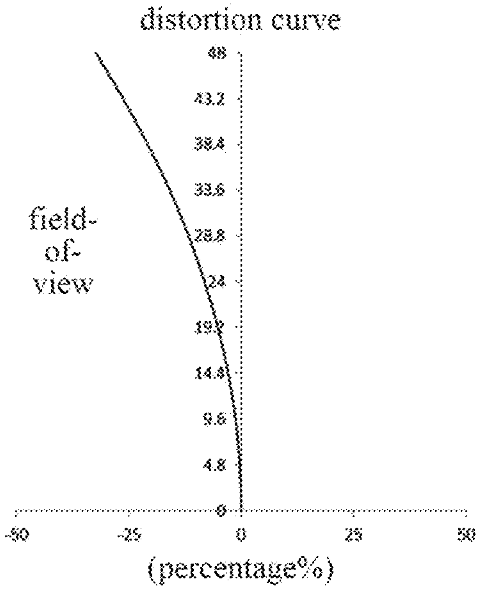

FIG. 9A illustrates a longitudinal aberration curve of the first optical system 100 in Embodiment 4, representing deviations of focal points at which lights of different wavelengths passing through the first optical system converge. FIG. 9B illustrates an astigmatic curve of the first optical system 100 in Embodiment 4, representing a curvature of a tangential image plane and a curvature of a sagittal image plane. FIG. 9C illustrates a distortion curve of the first optical system 100 in Embodiment 4, representing amounts of distortion corresponding to different field-of-views. It can be seen from FIGS. 9A-9C that the first optical system 100 given in Embodiment 4 can achieve a good imaging quality.

Specific embodiments of the second optical system that may be applicable to the above implementations are further described below with reference to the accompanying drawings.

Embodiment 5

A second optical system according to Embodiment 5 of the present disclosure is described below with reference to FIG. 10 to FIG. 11B.

Figure 10:
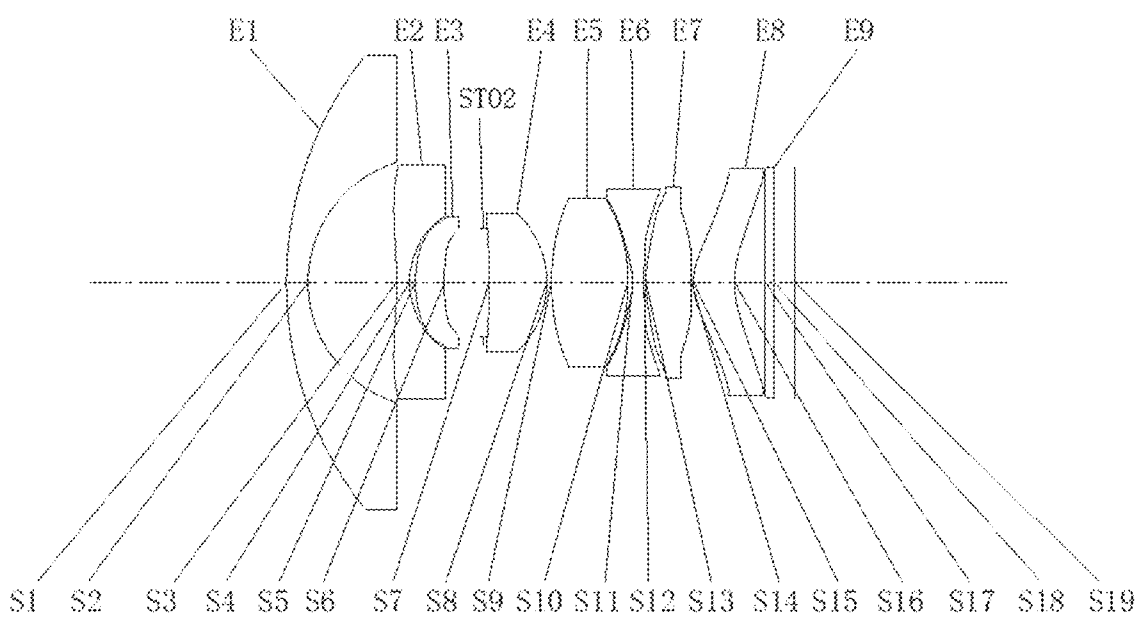
FIG. 10 illustrates a schematic structural diagram of a second optical system according to Embodiment 5 of the present disclosure.

As shown in FIG. 10, the second optical system 200 includes a first lens element E1, a second lens element E2, a third lens element E3, a fourth lens element E4, a fifth lens element E5, a sixth lens element E6, a seventh lens element E7, and an eighth lens element E8 arranged sequentially along a second optical axis from an object side to an image side. A second diaphragm STO2 may be provided between the third lens element E3 and the fourth lens element E4.

The first lens element E1 has a negative refractive power, an object-side surface S1 of the first lens element E1 is a convex surface, and an image-side surface S2 of the first lens element E1 is a concave surface. The second lens element E2 has a negative refractive power, an object-side surface S3 of the second lens element E2 is a concave surface, and an image-side surface S4 of the second lens element E2 is a concave surface. The third lens element E3 has a positive refractive power, an object-side surface S5 of the third lens element E3 is a convex surface, and an image-side surface S6 of the third lens element E3 is a concave surface. The fourth lens element E4 has a positive refractive power, an object-side surface S7 of the fourth lens element E4 is a concave surface, and an image-side surface S8 of the fourth lens element E4 is a convex surface. The fifth lens element E5 has a positive refractive power, an object-side surface S9 of the fifth lens element E5 is a convex surface, and an image-side surface S10 of the fifth lens element E5 is a convex surface. The sixth lens element E6 has a negative refractive power, an object-side surface S11 of the sixth lens element E6 is a concave surface, and an image-side surface S12 of the sixth lens element E6 is a concave surface. The seventh lens element E7 has a positive refractive power, an object-side surface S13 of the seventh lens element E7 is a convex surface, and an image-side surface S14 of the seventh lens element E7 is a convex surface. The eighth lens element E8 has a positive refractive power, an object-side surface S15 of the eighth lens element E8 is a convex surface, and an image-side surface S16 of the eighth lens element E8 is a concave surface. An optical filter E9 has an object-side surface S17 and an image-side surface S18. Light from an object sequentially passes through the surfaces S1-S18 and finally forms an image on an image plane S19.

Table 9 shows a table of basic parameters of the second optical system in Embodiment 5. Here, the units of a radius of curvature, a thickness/distance are all millimeters (mm).

TABLE 9

| surface number | surface type | radius of curvature | thickness/ distance | material: refractive index | material: abbe number | conic coefficient |
|---|---|---|---|---|---|---|
| OBJ | spherical | infinite | 4750.0000 | | | |
| S1 | spherical | 8.3946 | 0.4940 | 1.62 | 60.20 | |
| S2 | spherical | 2.8771 | 2.0195 | | | |
| S3 | aspheric | −15.4392 | 0.2907 | 1.54 | 56.11 | 8.2487 |
| S4 | aspheric | 1.5771 | 0.1374 | | | −0.1717 |
| S5 | aspheric | 2.8117 | 0.6605 | 1.67 | 19.24 | 1.6382 |
| S6 | aspheric | 9.4329 | 0.8875 | | | 55.2207 |
| STO2 | spherical | infinite | 0.1350 | | | |
| S7 | aspheric | −21.7683 | 1.3167 | 1.54 | 56.11 | −65.8328 |
| S8 | aspheric | −2.2178 | 0.1024 | | | 0.1181 |
| S9 | aspheric | 4.5882 | 1.7440 | 1.69 | 53.15 | 0.6009 |
| S10 | aspheric | −5.9856 | 0.1048 | | | −0.0342 |
| S11 | aspheric | −1.8262 | 0.2676 | 1.67 | 19.24 | −1.0163 |
| S12 | aspheric | 93.3034 | 0.0428 | | | 99.9000 |
| S13 | aspheric | 3.2466 | 1.0384 | 1.54 | 56.11 | 0.2044 |
| S14 | aspheric | −12.8683 | 0.0442 | | | −6.8177 |
| S15 | aspheric | 1.4963 | 0.9391 | 1.54 | 56.11 | −1.3249 |
| S16 | aspheric | 2.8500 | 0.7005 | | | −0.2557 |
| S17 | spherical | infinite | 0.1995 | 1.52 | 64.17 | |
| S18 | spherical | infinite | 0.4655 | | | |
| S19 | spherical | infinite | | | | |

In this embodiment, the object-side surface and the image-side surface of any lens element in the second lens element E2 to the eighth lens element E8 are both aspheric surfaces, and the surface type X of each aspheric lens element may be defined using, but not limited to, the following aspheric formula:

$$x = \frac{ch^2}{1 + \sqrt{1 - (k+1)c^2h^2}} + \sum Aih^i \quad (2)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 9 above); k is the conic coefficient; and Ai is the correction coefficient of an i-th order of the aspheric surface. Table 10 gives the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S3-S16 in Embodiment 5.

TABLE 10

| surface number | A4 | A6 | A8 | A10 | A12 | A14 | A16 |
|---|---|---|---|---|---|---|---|
| S3 | −2.4211E−02 | 5.0252E−02 | −5.9057E−02 | 4.9973E−02 | −3.0256E−02 | 1.3223E−02 | −4.2181E−03 |
| S4 | −1.4831E−01 | 9.4853E−01 | −5.3778E+00 | 1.9578E+01 | −4.7592E+01 | 7.9956E+01 | −9.5079E+01 |
| S5 | −1.4839E−02 | 2.7449E−01 | −1.8908E+00 | 7.8802E+00 | −2.1345E+01 | 3.9330E+01 | −5.0721E+01 |
| S6 | 1.0859E−01 | −9.4767E−01 | 8.2905E+00 | −4.4727E+01 | 1.6079E+02 | −4.0136E+02 | 7.1369E+02 |
| S7 | 1.2733E−02 | −9.4588E−02 | 3.0322E−01 | −5.1061E−01 | 3.0032E−01 | 4.7651E−01 | −1.2213E+00 |
| S8 | −2.4923E−02 | 8.8028E−02 | −2.1408E−01 | 3.4821E−01 | −3.7615E−01 | 2.7387E−01 | −1.3476E−01 |
| S9 | −2.3218E−02 | 4.9214E−02 | −9.7535E−02 | 1.3547E−01 | −1.3054E−01 | 8.9624E−02 | −4.4545E−02 |
| S10 | −3.6133E−02 | −8.0611E−02 | 3.6486E−01 | −6.1972E−01 | 5.4282E−01 | −2.2427E−01 | −1.4517E−02 |
| S11 | 3.3061E−02 | 1.0100E−01 | −5.5083E−02 | −1.1388E−01 | 1.3545E−01 | 5.4053E−03 | −1.0476E−01 |
| S12 | −7.8540E−03 | 1.2887E−01 | −2.0726E−01 | 2.0015E−01 | −1.2160E−01 | 3.8183E−02 | 4.2254E−03 |
| S13 | −5.5177E−03 | −1.0108E−01 | 1.8121E−01 | −2.1013E−01 | 1.7968E−01 | −1.1503E−01 | 5.4887E−02 |
| S14 | 1.2009E−01 | −4.5536E−01 | 7.8084E−01 | −9.1718E−01 | 7.8769E−01 | −5.0269E−01 | 2.3965E−01 |
| S15 | 5.4664E−02 | −2.7678E−01 | 4.1408E−01 | −4.0248E−01 | 2.7451E−01 | −1.3485E−01 | 4.8394E−02 |
| S16 | 5.3236E−02 | −8.7062E−02 | 7.4872E−02 | −6.1154E−02 | 4.3466E−02 | −2.3557E−02 | 9.2943E−03 |

| surface number | A18 | A20 | A22 | A24 | A26 | A28 | A30 |
|---|---|---|---|---|---|---|---|
| S3 | 9.8791E−04 | −1.6951E−04 | 2.1039E−05 | −1.8368E−06 | 1.0692E−07 | −3.7231E−09 | 5.8631E−11 |
| S4 | 8.1124E+01 | −4.9805E+01 | 2.1799E+01 | −6.6324E+00 | 1.3323E+00 | −1.5882E−01 | 8.5043E−03 |
| S5 | 4.6550E+01 | −3.0552E+01 | 1.4230E+01 | −4.5914E+00 | 9.7559E−01 | −1.2277E−01 | 6.9296E−03 |
| S6 | −9.1615E+02 | 8.5091E+02 | −5.6627E+02 | 2.6315E+02 | −8.1070E+01 | 1.4874E+01 | −1.2299E+00 |
| S7 | 1.2736E+00 | −7.6831E−01 | 2.7812E−01 | −5.6267E−02 | 4.9060E−03 | 0.0000E+00 | 0.0000E+00 |
| S8 | 4.4088E−02 | −9.1678E−03 | 1.0942E−03 | −5.6933E−05 | 0.0000E+00 | 0.0000E+00 | 0.0000E+00 |
| S9 | 1.6101E−02 | −4.2041E−03 | 7.7725E−04 | −9.7817E−05 | 7.7853E−06 | −3.3755E−07 | 5.3948E−09 |
| S10 | 6.9591E−02 | −4.0629E−02 | 1.3106E−02 | −2.6489E−03 | 3.3504E−04 | −2.4392E−05 | 7.8351E−07 |
| S11 | 9.2896E−02 | −4.3757E−02 | 1.2946E−02 | −2.4906E−03 | 3.0429E−04 | −2.1546E−05 | 6.7552E−07 |
| S12 | −1.0946E−02 | 5.8194E−03 | −1.7805E−03 | 3.4726E−04 | −4.2745E−05 | 3.0388E−06 | −9.5342E−08 |
| S13 | −1.9266E−02 | 4.8799E−03 | −8.6606E−04 | 1.0252E−04 | −7.3801E−06 | 2.6232E−07 | −2.0857E−09 |
| S14 | −8.5270E−02 | 2.2474E−02 | −4.3144E−03 | 5.8495E−04 | −5.2961E−05 | 2.8682E−06 | −7.0165E−08 |
| S15 | −1.2759E−02 | 2.4634E−03 | −3.4357E−04 | 3.3635E−05 | −2.1891E−06 | 8.4924E−08 | −1.4839E−09 |
| S16 | −2.6456E−03 | 5.4112E−04 | −7.8648E−05 | 7.9158E−06 | −5.2393E−07 | 2.0493E−08 | −3.5860E−10 |

FIG. 11A illustrates a longitudinal aberration curve of the second optical system 200 in Embodiment 5, representing deviations of focal points at which lights of different wavelengths passing through the second optical system converge. FIG. 11B illustrates an astigmatic curve of the second optical system 200 in Embodiment 5, representing a curvature of a tangential image plane and a curvature of a sagittal image plane corresponding to different image heights. It can be seen from FIG. 11A and FIG. 11C that the second optical system 200 given in Embodiment 5 can achieve a good imaging quality.

Embodiment 6

A second optical system according to Embodiment 6 of the present disclosure is described below with reference to FIG. 12 to FIG. 13B.

As shown in FIG. 12, the second optical system 200 includes a first lens element E1, a second lens element E2, a third lens element E3, a fourth lens element E4, a fifth lens element E5, a sixth lens element E6, a seventh lens element E7, and an eighth lens element E8 arranged sequentially along a second optical axis from an object side to an image side. A second diaphragm STO2 may be provided between the third lens element E3 and the fourth lens element E4.

The first lens element E1 has a negative refractive power, an object-side surface S1 of the first lens element E1 is a convex surface, and an image-side surface S2 of the first lens element E1 is a concave surface. The second lens element E2 has a negative refractive power, an object-side surface S3 of the second lens element E2 is a concave surface, and an image-side surface S4 of the second lens element E2 is a concave surface. The third lens element E3 has a positive refractive power, an object-side surface S5 of the third lens element E3 is a convex surface, and an image-side surface S6 of the third lens element E3 is a concave surface. The fourth lens element E4 has a positive refractive power, an object-side surface S7 of the fourth lens element E4 is a concave surface, and an image-side surface S8 of the fourth lens element E4 is a convex surface. The fifth lens element E5 has a positive refractive power, an object-side surface S9 of the fifth lens element E5 is a convex surface, and an image-side surface S10 of the fifth lens element E5 is a convex surface. The sixth lens element E6 has a negative refractive power, an object-side surface S11 of the sixth lens element E6 is a concave surface, and an image-side surface S12 of the sixth lens element E6 is a concave surface. The seventh lens element E7 has a positive refractive power, an object-side surface S13 of the seventh lens element E7 is a convex surface, and an image-side surface S14 of the seventh lens element E7 is a convex surface. The eighth lens element E8 has a positive refractive power, an object-side surface S15 of the eighth lens element E8 is a convex surface, and an image-side surface S16 of the eighth lens element E8 is a concave surface. An optical filter E9 has an object-side surface S17 and an image-side surface S18. Light from an object sequentially passes through the surfaces S1-S18 and finally forms an image on an image plane S19.

Table 11 shows a table of basic parameters of the second optical system in Embodiment 6. Here, the units of a radius of curvature, a thickness/distance are all millimeters (mm).

TABLE 11

| surface number | surface type | radius of curvature | thickness/ distance | material: refractive index | material: abbe number | conic coefficient |
|---|---|---|---|---|---|---|
| OBJ | spherical | infinite | 1050.0000 | | | |
| S1 | spherical | 9.2555 | 0.5460 | 1.62 | 60.30 | |
| S2 | spherical | 3.2169 | 2.2736 | | | |
| S3 | aspheric | −14.7991 | 0.3289 | 1.54 | 56.11 | 5.8675 |
| S4 | aspheric | 1.7621 | 0.1378 | | | −0.1816 |
| S5 | aspheric | 3.0418 | 0.7499 | 1.67 | 19.24 | 1.4952 |
| S6 | aspheric | 10.4692 | 0.9110 | | | 52.7511 |
| STO2 | spherical | infinite | 0.1797 | | | |
| S7 | aspheric | −21.4929 | 1.4805 | 1.54 | 56.11 | −99.9000 |
| S8 | aspheric | −2.5245 | 0.1033 | | | 0.1256 |
| S9 | aspheric | 4.8585 | 1.9123 | 1.69 | 53.15 | 0.5607 |
| S10 | aspheric | −6.8589 | 0.1153 | | | −0.3928 |
| S11 | aspheric | −2.0548 | 0.2997 | 1.67 | 19.24 | −1.0289 |
| S12 | aspheric | 124.1460 | 0.0564 | | | 99.9000 |
| S13 | aspheric | 3.4991 | 1.1342 | 1.54 | 56.11 | 0.2175 |
| S14 | aspheric | −17.0068 | 0.0730 | | | −14.6505 |
| S15 | aspheric | 1.6045 | 0.9848 | 1.54 | 56.11 | −1.3164 |
| S16 | aspheric | 3.0975 | 0.7884 | | | −0.2679 |
| S17 | spherical | infinite | 0.2205 | 1.52 | 64.17 | |
| S18 | spherical | infinite | 0.5145 | | | |
| S19 | spherical | infinite | | | | |

In this embodiment, the object-side surface and the image-side surface of any lens element in the second lens element E2 to the eighth lens element E8 are both aspheric surfaces. Table 12 gives the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S3-S16 in Embodiment 6.

TABLE 12

| surface number | A4 | A6 | A8 | A10 | A12 | A14 | A16 |
|---|---|---|---|---|---|---|---|
| S3 | −2.6749E−02 | 6.2251E−02 | −7.7864E−02 | 6.7573E−02 | −4.1146E−02 | 1.7914E−02 | −5.6644E−03 |
| S4 | −1.4769E−01 | 8.2606E−01 | −4.3203E+00 | 1.5016E+01 | −3.5258E+01 | 5.7290E+01 | −6.5814E+01 |
| S5 | −1.3890E−02 | 2.1753E−01 | −1.3371E+00 | 5.2712E+00 | −1.3693E+01 | 2.4185E+01 | −2.9833E+01 |
| S6 | 8.5792E−02 | −5.1630E−01 | 4.5106E+00 | −2.3976E+01 | 8.4988E+01 | −2.0949E+02 | 3.6838E+02 |
| S7 | 8.7268E−03 | −4.8330E−02 | 5.6934E−02 | 2.4970E−01 | −1.1762E+00 | 2.3559E+00 | −2.8079E+00 |
| S8 | −2.1471E−02 | 5.9646E−02 | −1.1876E−01 | 1.5943E−01 | −1.3865E−01 | 7.7516E−02 | −2.6882E−02 |
| S9 | −2.3598E−02 | 4.6178E−02 | −8.9381E−02 | 1.2384E−01 | −1.2021E−01 | 8.3664E−02 | −4.2371E−02 |
| S10 | −3.7354E−02 | −1.0424E−01 | 4.5855E−01 | −8.0838E−01 | 7.8769E−01 | −4.4831E−01 | 1.3524E−01 |
| S11 | 3.1022E−02 | 1.1025E−01 | −2.4027E−02 | −2.2594E−01 | 3.0995E−01 | −1.6801E−01 | 1.6398E−02 |
| S12 | 4.7382E−03 | 5.5811E−02 | 1.3894E−02 | −1.7974E−01 | 3.0399E−01 | −2.9404E−01 | 1.9105E−01 |
| S13 | 1.5023E−02 | −2.1134E−01 | 4.2561E−01 | −5.4612E−01 | 4.9482E−01 | −3.2654E−01 | 1.5918E−01 |
| S14 | 1.3551E−01 | −5.0301E−01 | 8.1048E−01 | −8.7161E−01 | 6.7731E−01 | −3.9027E−01 | 1.6857E−01 |
| S15 | 7.1887E−02 | −3.1336E−01 | 4.4883E−01 | −4.1781E−01 | 2.7294E−01 | −1.2871E−01 | 4.4455E−02 |
| S16 | 7.4397E−02 | −1.1290E−01 | 9.6392E−02 | −7.7573E−02 | 5.5481E−02 | −3.1280E−02 | 1.3131E−02 |

| surface number | A18 | A20 | A22 | A24 | A26 | A28 | A30 |
|---|---|---|---|---|---|---|---|
| S3 | 1.3116E−03 | −2.2218E−04 | 2.7211E−05 | −2.3446E−06 | 1.3477E−07 | −4.6393E−09 | 7.2328E−11 |
| S4 | 5.4174E+01 | −3.2046E+01 | 1.3498E+01 | −3.9473E+00 | 7.6114E−01 | −8.6959E−02 | 4.4554E−03 |
| S5 | 2.6163E+01 | −1.6406E+01 | 7.3019E+00 | −2.2521E+00 | 4.5750E−01 | −5.5034E−02 | 2.9680E−03 |
| S6 | −4.6808E+02 | 4.3048E+02 | −2.8362E+02 | 1.3042E+02 | −3.9725E+01 | 7.1993E+00 | −5.8744E−01 |
| S7 | 2.1497E+00 | −1.0694E+00 | 3.3482E−01 | −6.0010E−02 | 4.6983E−03 | 0.0000E+00 | 0.0000E+00 |
| S8 | 5.1372E−03 | −3.0093E−04 | −5.8114E−05 | 8.1526E−06 | 0.0000E+00 | 0.0000E+00 | 0.0000E+00 |
| S9 | 1.5696E−02 | −4.2353E−03 | 8.1998E−04 | −1.1046E−04 | 9.7787E−06 | −5.0810E−07 | 1.1638E−08 |
| S10 | −4.1450E−03 | −1.4052E−02 | 6.2113E−03 | −1.3995E−03 | 1.8528E−04 | −1.3733E−05 | 4.4260E−07 |
| S11 | 3.1691E−02 | −2.1368E−02 | 7.0936E−03 | −1.4278E−03 | 1.7714E−04 | −1.2539E−05 | 3.8951E−07 |
| S12 | −8.7740E−02 | 2.8919E−02 | −6.8064E−03 | 1.1168E−03 | −1.2136E−04 | 7.8476E−06 | −2.2855E−07 |
| S13 | −5.7514E−02 | 1.5317E−02 | −2.9607E−03 | 4.0335E−04 | −3.6680E−05 | 1.9975E−06 | −4.9270E−08 |
| S14 | −5.4689E−02 | 1.3249E−02 | −2.3589E−03 | 2.9929E−04 | −2.5579E−05 | 1.3181E−06 | −3.0896E−08 |
| S15 | −1.1303E−02 | 2.1061E−03 | −2.8333E−04 | 2.6709E−05 | −1.6690E−06 | 6.1920E−08 | −1.0290E−09 |
| S16 | −4.0191E−03 | 8.8664E−04 | −1.3887E−04 | 1.5025E−05 | −1.0660E−06 | 4.4582E−08 | −8.3250E−10 |

FIG. 13A illustrates a longitudinal aberration curve of the second optical system 200 in Embodiment 6, representing deviations of focal points at which lights of different wavelengths passing through the second optical system converge. FIG. 13B illustrates an astigmatic curve of the second optical system 200 in Embodiment 6, representing a curvature of a tangential image plane and a curvature of a sagittal image plane corresponding to different image heights. It can be seen from FIG. 13A and FIG. 13C that the second optical system 200 given in Embodiment 6 can achieve a good imaging quality.

Embodiment 7

A second optical system according to Embodiment 7 of the present disclosure is described below with reference to FIG. 14 to FIG. 15B.

As shown in FIG. 14, the second optical system 200 includes a first lens element E1, a second lens element E2, a third lens element E3, a fourth lens element E4, a fifth lens element E5, a sixth lens element E6, a seventh lens element E7, and an eighth lens element E8 arranged sequentially along a second optical axis from an object side to an image side. A second diaphragm STO2 may be provided between the third lens element E3 and the fourth lens element E4.

The first lens element E1 has a negative refractive power, an object-side surface S1 of the first lens element E1 is convex surface, and an image-side surface S2 of the first lens element E1 is a concave surface. The second lens element E2 has a negative refractive power, an object-side surface S3 of the second lens element E2 is a convex surface, and an image-side surface S4 of the second lens element E2 is a concave surface. The third lens element E3 has a positive refractive power, an object-side surface S5 of the third lens element E3 is a concave surface, and an image-side surface S6 of the third lens element E3 is a convex surface. The fourth lens element E4 has a positive refractive power, an object-side surface S7 of the fourth lens element E4 is a concave surface, and an image-side surface S8 of the fourth lens element E4 is a convex surface. The fifth lens element E5 has a negative refractive power, an object-side surface S9 of the fifth lens element E5 is a convex surface, and an image-side surface S10 of the fifth lens element E5 is a concave surface. The sixth lens element E6 has a negative refractive power, an object-side surface S11 of the sixth lens element E6 is a concave surface, and an image-side surface S12 of the sixth lens element E6 is a convex surface. The seventh lens element E7 has a positive refractive power, an object-side surface S13 of the seventh lens element E7 is a convex surface, and an image-side surface S14 of the seventh lens element E7 is a convex surface. The eighth lens element E8 has a negative refractive power, an object-side surface S15 of the eighth lens element E8 is a concave surface, and an image-side surface S16 of the eighth lens element E8 is a convex surface. An optical filter E9 has an object-side surface S17 and an image-side surface S18. Light from an object sequentially passes through the surfaces S1-S18 and finally forms an image on an image plane S19.

Table 13 shows a table of basic parameters of the second optical system in Embodiment 7. Here, the units of a radius of curvature, a thickness/distance are all millimeters (mm).

TABLE 13

| | | radius | | material | | |
|---|---|---|---|---|---|---|
| surface number | surface type | of curvature | thickness/ distance | refractive index | abbe number | conic coefficient |
| OBJ | spherical | infinite | 4750.0000 | | | |
| S1 | spherical | 6.6597 | 0.2677 | 1.60 | 61.60 | |
| S2 | spherical | 2.2298 | 1.7397 | | | |
| S3 | aspheric | 8.6153 | 0.2850 | 1.49 | 70.40 | −33.5619 |
| S4 | aspheric | 1.8291 | 1.0904 | | | 0.1798 |
| S5 | aspheric | −32.9125 | 1.0353 | 1.75 | 31.00 | −99.9000 |
| S6 | aspheric | −6.0462 | 0.3429 | | | −3.3537 |
| STO2 | spherical | infinite | 0.2995 | | | |
| S7 | aspheric | 5.8605 | 0.7534 | 1.70 | 49.20 | −0.8256 |
| S8 | aspheric | −2.1404 | 0.0285 | | | 0.0356 |
| S9 | aspheric | 10.0092 | 0.2539 | 1.76 | 27.60 | −26.0241 |
| S10 | aspheric | 1.7836 | 0.2463 | | | −1.0773 |
| S11 | aspheric | −2.8679 | 0.8075 | 1.61 | 60.80 | 0.0545 |
| S12 | aspheric | −3.6196 | 0.0285 | | | −0.0513 |
| S13 | aspheric | 1.7242 | 1.7985 | 1.60 | 61.20 | −1.0451 |
| S14 | aspheric | −2.9927 | 0.0840 | | | −0.7712 |
| S15 | aspheric | −1.4132 | 0.2847 | 1.76 | 27.60 | −1.0172 |
| S16 | aspheric | −2.6390 | 1.1043 | | | −0.6022 |
| S17 | spherical | infinite | 0.1995 | 1.52 | 64.17 | |
| S18 | spherical | infinite | 0.4655 | | | |
| S19 | spherical | infinite | | | | |

In this embodiment, the object-side surface and the image-side surface of any lens element in the second lens element E2 to the eighth lens element E8 are both aspheric surfaces. Table 14 gives the high-order coefficients $A_4$, $A_6$, $A_8$, $A_{10}$, $A_{12}$, $A_{14}$, $A_{16}$ applicable to the aspheric surfaces S3-S16 in Embodiment 7.

TABLE 14

| surface number | A4 | A6 | A8 | A10 | A12 | A14 | A16 |
|---|---|---|---|---|---|---|---|
| S3 | 8.9298E−02 | −5.4309E−02 | 2.2149E−02 | −6.3682E−03 | 1.1680E−03 | −1.1917E−04 | 5.1661E−06 |
| S4 | 1.0247E−01 | −3.8395E−02 | −4.5302E−03 | 8.1931E−03 | 1.9099E−03 | −4.0485E−03 | 1.0603E−03 |
| S5 | −2.0096E−02 | −3.2065E−03 | −9.5992E−03 | 1.2870E−02 | −1.1030E−02 | 4.6511E−03 | −7.6454E−04 |
| S6 | −3.3965E−02 | 1.0110E−02 | −3.0157E−02 | 3.9085E−02 | −2.6270E−02 | 8.8194E−03 | −1.1369E−03 |
| S7 | −1.7583E−03 | −1.7643E−02 | 1.5077E−02 | −6.9004E−03 | −4.2219E−04 | 1.6891E−03 | −4.4624E−04 |
| S8 | 9.8444E−02 | −4.4437E−02 | 1.3198E−02 | 1.6890E−03 | −8.8315E−03 | 5.3311E−03 | −1.0075E−03 |
| S9 | −2.3813E−01 | 1.4589E−01 | 6.9229E−03 | −7.4235E−02 | 4.3334E−02 | −1.0024E−02 | 7.5499E−04 |
| S10 | −2.0844E−01 | 1.4023E−01 | −6.2861E−02 | 1.7298E−02 | −2.7494E−03 | 2.2930E−04 | −9.3904E−06 |
| S11 | 3.4993E−01 | −3.3086E−01 | 2.0183E−01 | −7.8038E−02 | 1.8841E−02 | −2.6066E−03 | 1.5898E−04 |
| S12 | 1.0765E−02 | −3.8220E−02 | 3.5533E−02 | −2.1289E−02 | 7.7995E−03 | −1.5001E−03 | 1.1730E−04 |
| S13 | −8.8282E−02 | 4.5396E−02 | −2.0367E−02 | 6.2777E−03 | −1.1803E−03 | 1.2359E−04 | −5.5793E−06 |
| S14 | −3.1592E−02 | 2.2121E−02 | −7.4006E−03 | 1.5974E−03 | −2.1927E−04 | 1.8806E−05 | −7.9900E−07 |
| S15 | 1.8244E−01 | −1.0551E−01 | 4.1941E−02 | −1.0852E−02 | 1.7009E−03 | −1.4513E−04 | 5.1556E−06 |
| S16 | 1.9951E−01 | −9.3892E−02 | 2.9126E−02 | −6.1129E−03 | 8.1530E−04 | −6.0967E−05 | 1.9044E−06 |

Figures 15A, 15B:
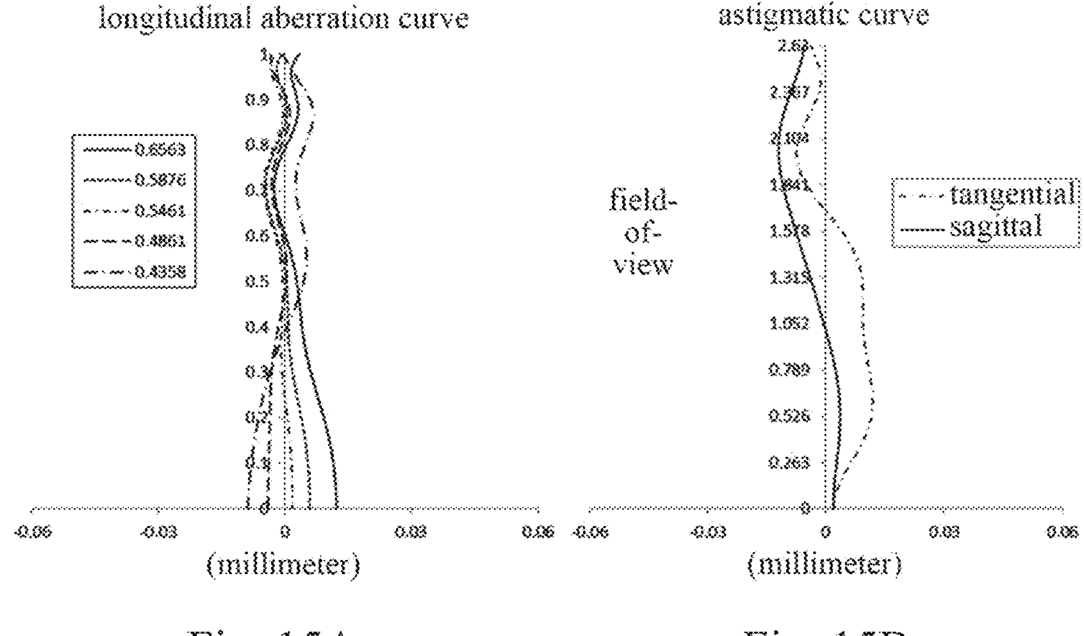
FIGS. 15A-15B respectively illustrate a longitudinal aberration curve and an astigmatic curve of the second optical system according to Embodiment 7 of the present disclosure.

FIG. 15A illustrates a longitudinal aberration curve of the second optical system 200 in Embodiment 7, representing deviations of focal points at which lights of different wavelengths passing through the second optical system converge. FIG. 15B illustrates an astigmatic curve of the second optical system 200 in Embodiment 7, representing a curvature of a tangential image plane and a curvature of a sagittal image plane corresponding to different image heights. It can be seen from FIG. 15A and FIG. 150 that the second optical system 200 given in Embodiment 7 can achieve a good imaging quality.

Referring to FIGS. 1A-1C, a virtual reality apparatus 10 provided in the present disclosure may include the first optical system 100 in any of the above embodiments and the second optical system 200 in any of the above embodiments, and the first optical system and the second optical system are combined in pairs to form 12 virtual reality apparatuses, i.e., the virtual reality apparatus has 12 examples. In which, Example 1: The virtual reality apparatus includes the first optical system in Embodiment 1 and the second optical system in Embodiment 5;

Example 2: The virtual reality apparatus includes the first optical system in Embodiment 1 and the second optical system in Embodiment 6;

Example 3: The virtual reality apparatus includes the first optical system in Embodiment 1 and the second optical system in Embodiment 7;

Example 4: The virtual reality apparatus includes the first optical system in Embodiment 2 and the second optical system in Embodiment 5;

Example 5: The virtual reality apparatus includes the first optical system in Embodiment 2 and the second optical system in Embodiment 6;

Example 6: The virtual reality apparatus includes the first optical system in Embodiment 2 and the second optical system in Embodiment 7;

Example 7: The virtual reality apparatus includes the first optical system in Embodiment 3 and the second optical system in Embodiment 5;

Example 8: The virtual reality apparatus includes the first optical system in Embodiment 3 and the second optical system in Embodiment 6;

Example 9: The virtual reality apparatus includes the first optical system in Embodiment 3 and the second optical system in Embodiment 7;

Example 10: The virtual reality apparatus includes the first optical system in Embodiment 4 and the second optical system in Embodiment 5;

Example 11: The virtual reality apparatus includes the first optical system in Embodiment 4 and the second optical system in Embodiment 6; and Example 12: The virtual reality apparatus includes the first optical system in Embodiment 4 and the second optical system in Embodiment 7.

It should be understood that as shown in FIG. 1A, the virtual reality apparatus 10 provided in the present disclosure may further include a third optical system 300, and that the structure of the third optical system 300 may be different from the structure of the first optical system 100, and the second optical system 200.

Table 15 gives values of some parameters of the first optical system in Embodiment 1 to Embodiment 4.

TABLE 15

| parameter | embodiment | | | |
|---|---|---|---|---|
| | one | two | three | four |
| f23' (mm) | 99.38 | 162.36 | 111.56 | 76.61 |
| f1' (mm) | 91.32 | 173.88 | 88.05 | 256.72 |
| f2' (mm) | −452.24 | −104.30 | −237.25 | 2049.21 |
| f3' (mm) | 82.53 | 67.10 | 77.57 | 79.35 |
| EPD' (mm) | 5.00 | 5.00 | 5.00 | 5.00 |
| f' (mm) | 15.89 | 14.88 | 15.90 | 15.09 |
| TD' (mm) | 15.03 | 13.43 | 16.10 | 13.09 |

Table 16 gives values of some parameters of the second optical system in Embodiment 5 to Embodiment 7.

TABLE 16

| parameter | embodiment | | |
|---|---|---|---|
| | five | six | seven |
| f1 (mm) | −7.28 | −8.21 | −5.73 |
| f2(mm) | −2.61 | −2.86 | −4.81 |
| f3(mm) | 5.68 | 6.08 | 9.62 |
| f4(mm) | 4.42 | 5.10 | 2.33 |
| f5(mm) | 4.00 | 4.38 | −2.89 |
| f6(mm) | −2.64 | −2.98 | −38.04 |
| f7(mm) | 4.86 | 5.42 | 2.11 |
| f8(mm) | 4.63 | 4.95 | −4.44 |

TABLE 16-continued

| | embodiment | | |
|---|---|---|---|
| parameter | five | six | seven |
| f(mm) | 1.36 | 1.50 | 1.39 |
| EPD(mm) | 1.23 | 1.43 | 1.06 |
| FOV(°) | 214.0 | 214.0 | 212.0 |
| ΣCT(mm) | 6.75 | 7.44 | 5.49 |
| TD(mm) | 10.22 | 11.29 | 9.35 |
| SAG11(mm) | 1.79 | 2.01 | 2.10 |
| SAG12(mm) | 2.03 | 2.26 | 2.26 |
| SAG81(mm) | 0.79 | 0.97 | −0.84 |
| f123(mm) | −2.48 | −2.78 | −4.34 |
| f45(mm) | 2.23 | 2.48 | 7.59 |
| f567(mm) | 8.87 | 9.20 | 2.60 |

Table 17 illustrates values of the conditional expressions for each example in Examples 1-12.

TABLE 17

| | example | | | | | | | | | | | |
|---|---|---|---|---|---|---|---|---|---|---|---|---|
| conditional expression | 1 | 2 | 3 | 4 | 5 | 6 | 7 | 8 | 9 | 10 | 11 | 12 |
| (f'/R1')/(f/R1) | 1.26 | 1.26 | 0.97 | −0.18 | −0.18 | −0.14 | 1.24 | 1.24 | 0.96 | −0.19 | −0.19 | −0.14 |
| (EPD'/f1')/(EPD/f1) | −0.32 | −0.32 | −0.30 | −0.17 | −0.17 | −0.16 | −0.34 | −0.33 | −0.31 | −0.11 | −0.11 | −0.11 |
| (TD'/CT1')/(TD/CT1) | 0.13 | 0.13 | 0.08 | 0.17 | 0.17 | 0.10 | 0.12 | 0.12 | 0.07 | 0.19 | 0.19 | 0.11 |
| (ΣCT'/f')/(ΣCT/f) | 0.18 | 0.18 | 0.23 | 0.18 | 0.18 | 0.22 | 0.20 | 0.20 | 0.25 | 0.17 | 0.17 | 0.21 |
| f23'/f1' | 1.09 | 1.09 | 1.09 | 0.93 | 0.93 | 0.93 | 1.27 | 1.27 | 1.27 | 0.30 | 0.30 | 0.30 |
| f3'/\|f2'\| | 0.18 | 0.18 | 0.18 | 0.64 | 0.64 | 0.64 | 0.33 | 0.33 | 0.33 | 0.04 | 0.04 | 0.04 |
| R2'/R1' | −1.71 | −1.71 | −1.71 | 0.16 | 0.16 | 0.16 | −1.49 | −1.49 | −1.49 | 0.22 | 0.22 | 0.22 |
| f*tan(FOV/4) | 1.83 | 2.02 | 1.84 | 1.83 | 2.02 | 1.84 | 1.83 | 2.02 | 1.84 | 1.83 | 2.02 | 1.84 |
| f123/f567 | −0.28 | −0.30 | −1.67 | −0.28 | −0.30 | −1.67 | −0.28 | −0.30 | −1.67 | −0.28 | −0.30 | −1.67 |
| SAG12/T12 | 1.01 | 0.99 | 1.30 | 1.01 | 0.99 | 1.30 | 1.01 | 0.99 | 1.30 | 1.01 | 0.99 | 1.30 |
| f8/SAG81 | 5.86 | 5.09 | 5.28 | 5.86 | 5.09 | 5.28 | 5.86 | 5.09 | 5.28 | 5.86 | 5.09 | 5.28 |
| (R8 + R9)/f45 | 1.06 | 0.94 | 1.04 | 1.06 | 0.94 | 1.04 | 1.06 | 0.94 | 1.04 | 1.06 | 0.94 | 1.04 |
| R1/SAG11 | 4.69 | 4.61 | 3.17 | 4.69 | 4.61 | 3.17 | 4.69 | 4.61 | 3.17 | 4.69 | 4.61 | 3.17 |
| R13/CT7 | 3.13 | 3.09 | 0.96 | 3.13 | 3.09 | 0.96 | 3.13 | 3.09 | 0.96 | 3.13 | 3.09 | 0.96 |
| CT3'/CT2' | 4.78 | 4.78 | 4.78 | 9.20 | 9.20 | 9.20 | 5.81 | 5.81 | 5.81 | 8.89 | 8.89 | 8.89 |

The foregoing is only a description for the preferred embodiments of the present disclosure and the applied technical principles. It should be appreciated by those skilled in the art that the scope of the present disclosure is not limited to the technical solution formed by the particular combination of the above technical features. The scope should also cover other technical solutions formed by any combination of the above technical features or equivalent features thereof without departing from the concept of the present disclosure, for example, technical solutions formed by replacing the features disclosed in the present disclosure with (but not limited to) technical features with similar functions.

What is claimed is:

1. A virtual reality apparatus, comprising a first optical system and a second optical system, wherein, the first optical system sequentially comprises, along a first optical axis from a first side to a second side, a first lens having a positive refractive power, a reflective polarizing element, a quarter wave plate, a second lens having a refractive power and a third lens having a positive refractive power;

the second optical system sequentially comprises, along a second optical axis from an object side to an image side:

a first lens element having a negative refractive power, an object-side surface of the first lens element being a convex surface, and an image-side surface of the first lens element being a concave surface;

a second lens element having a negative refractive power, an image-side surface of the second lens element being a concave surface;

a third lens element having a positive refractive power;

a fourth lens element having a positive refractive power, an image-side surface of the fourth lens element being a convex surface;

a fifth lens element having a refractive power, an object-side surface of the fifth lens element being a convex surface;

a sixth lens element having a negative refractive power, an object-side surface of the sixth lens element being a concave surface;

a seventh lens element having a positive refractive power, an object-side surface of the seventh lens element being a convex surface, and an image-side surface of the seventh lens element being a convex surface; and an eighth lens element having a refractive power;

wherein, a number of lenses having refractive powers in the first optical system is three and a number of lens elements having refractive powers in the second optical system is eight;

a real image formed by the second optical system is transmitted in a form of an electrical signal to a display screen on the second side of the first optical system, and the first optical system is used to project an imaginary image of the display screen and the real image transmitted to the display screen;

a total effective focal length f' of the first optical system, a radius of curvature R1' of a first side surface of the first lens, a total effective focal length f of the second optical system, and a radius of curvature R1 of the object-side surface of the first lens element satisfy: $-0.2<(f'/R1')/(f/R1)<1.3$.

2. The virtual reality apparatus according to claim 1, wherein, an effective focal length f1' of the first lens, an entrance pupil diameter EPD' of the first optical system, an effective focal length f1 of the first lens element, and an entrance pupil diameter EPD of the second optical system satisfy: $-0.34\leq(EPD'/f1')/(EPD/f1)<-0.1$.

3. The virtual reality apparatus according to claim 1, wherein, a distance TD' from the first side surface of the first lens to a second side surface of the third lens on the first optical axis, a center thickness CT1' of the first lens on the first optical axis, a distance TD from the object-side surface of the first lens element to an image-side surface of the eighth lens element on the second optical axis, and a center thickness CT1 of the first lens element on the second optical axis satisfy: 0.07≤(TD'/CT1')/(TD/CT1)≤0.19.

4. The virtual reality apparatus according to claim 1, wherein, a sum of center thicknesses ΣCT' of lenses from the first lens to the third lens on the first optical axis, a sum of center thicknesses ΣCT of lenses from the first lens element to the eighth lens element on the second optical axis, the total effective focal length f' of the first optical system and the total effective focal length f of the second optical system satisfy: 0.17≤(ΣCT'/f')/(ΣCT/f)≤0.25.

5. The virtual reality apparatus according to claim 1, wherein, a combined focal length f23' of the second lens and the third lens and the effective focal length f1' of the first lens satisfy: 0.30≤f23'/f1'<1.3.

6. The virtual reality apparatus according to claim 1, wherein, an effective focal length f2' of the second lens and an effective focal length f3' of the third lens satisfy: 0<f3'/|f2'|<0.65.

7. The virtual reality apparatus according to claim 1, wherein, a radius of curvature R2' of a second side surface of the first lens and the radius of curvature R1' of the first side surface of the first lens satisfy: −1.71≤R2'/R1'≤0.22.

8. The virtual reality apparatus according to claim 1, wherein, a center thickness CT2' of the second lens on the first optical axis and a center thickness CT3' of the third lens on the first optical axis satisfy: 4.78≤CT3'/CT2'≤9.20.

9. The virtual reality apparatus according to claim 1, wherein, the total effective focal length f of the second optical system and a maximal field-of-view FOV of the second optical system satisfy: 1.8 mm<f*tan(FOV/4)≤2.02 mm.

10. The virtual reality apparatus according to claim 1, wherein, a combined focal length f123 of the first lens element, the second lens element and the third lens element and a combined focal length f567 of the fifth lens element, the sixth lens element and the seventh lens element satisfy: −1.7<f123/f567≤−0.28.

11. The virtual reality apparatus according to claim 1, wherein, an axial distance SAG12 from an intersection point of the image-side surface of the first lens element on the second optical axis to a vertex of an effective radius of the image-side surface of the second lens element, and an air spacing T12 between the first lens element and the second lens element on the second optical axis satisfy: 0.99≤SAG12/T12≤1.30.

12. The virtual reality apparatus according to claim 1, wherein, an effective focal length f8 of the eighth lens element and an axial distance SAG81 from an intersection point of an object-side surface of the eighth lens element on the second optical axis to a vertex of an effective radius of the object-side surface of the eighth lens element satisfy: 5.09≤f8/SAG81<5.9.

13. The virtual reality apparatus according to claim 1, wherein, a radius of curvature R8 of the image-side surface of the fourth lens element, a radius of curvature R9 of the object-side surface of the fifth lens element, and a combined focal length f45 of the fourth lens element and the fifth lens element satisfy: 0.94≤(R8+R9)/f45≤1.06.

14. The virtual reality apparatus according to claim 1, wherein, the radius of curvature R1 of the object-side surface of the first lens element and an axial distance SAG11 from an intersection point of the object-side surface of the first lens element on the second optical axis to a vertex of an effective radius of the first lens satisfy: 3.17≤R1/SAG11<4.7.

15. The virtual reality apparatus according to claim 1, wherein, a radius of curvature R13 of the object-side surface of the seventh lens element and a center thickness CT7 of the seventh lens element on the second optical axis satisfy: 0.96≤R13/CT7≤3.13.

* * * * *